US012307945B2

(12) United States Patent
Son et al.

(10) Patent No.: US 12,307,945 B2
(45) Date of Patent: May 20, 2025

(54) DISPLAY DEVICE

(71) Applicant: Samsung Display Co., LTD., Yongin-si (KR)

(72) Inventors: Sun Kwun Son, Yongin-si (KR); Dong Hee Shin, Yongin-si (KR); Na Hyeon Cha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 58 days.

(21) Appl. No.: 17/474,571

(22) Filed: Sep. 14, 2021

(65) Prior Publication Data

US 2022/0246086 A1 Aug. 4, 2022

(30) Foreign Application Priority Data

Feb. 1, 2021 (KR) ........................ 10-2021-0014398

(51) Int. Cl.
*G09G 3/32* (2016.01)
*G09G 3/30* (2006.01)
*G09G 3/3233* (2016.01)

(52) U.S. Cl.
CPC ................. *G09G 3/32* (2013.01); *G09G 3/30* (2013.01); *G09G 3/3233* (2013.01); *G09G 2300/0842* (2013.01); *G09G 2310/0267* (2013.01); *G09G 2310/0272* (2013.01); *G09G 2310/0286* (2013.01); *G09G 2320/02* (2013.01); *G09G 2320/0295* (2013.01)

(58) Field of Classification Search
CPC .......... G09G 3/30; G09G 3/32; G09G 3/3233; G09G 2310/0267; G09G 2310/0272; G09G 2310/0286; G09G 2300/0842; G09G 2320/02; G09G 2320/0295; G09F 9/30; H01L 25/0753; H01L 27/1214
USPC ........................................................... 345/55
See application file for complete search history.

(56) References Cited

U.S. PATENT DOCUMENTS 9,035,926 B2 5/2015 Cho et al.
9,368,058 B2 * 6/2016 Omata .............. H10K 59/1213
(Continued)

FOREIGN PATENT DOCUMENTS

KR 10-2016-0079977 7/2016
KR 10-2016-0110840 9/2016
(Continued)

*Primary Examiner* — Jason M Mandeville
(74) *Attorney, Agent, or Firm* — KILE PARK REED & HOUTTEMAN PLLC

(57) ABSTRACT

A display device includes gate lines and data lines in a display area, pixels in the display area and electrically connected to the gate lines, the data lines, a first power source line, and a second power source line, a driving circuit supplying gate signals and data signals to the gate lines and the data lines, and including a first circuit element disposed in the display area between the pixels, and a conductive pattern disposed in the display area, overlapping the first circuit element, and electrically connected to the second power source line. Each pixel includes a first electrode electrically connected to the first power source line, a second electrode electrically connected to the second power source line, and at least one light emitting element between the first electrode and the second electrode. The conductive pattern, the first electrode, and the second electrode are on a same layer.

30 Claims, 13 Drawing Sheets

(56) References Cited

U.S. PATENT DOCUMENTS

| | | | | |
|---|---|---|---|---|
| 9,704,429 | B2 | 7/2017 | Seo et al. | |
| 10,163,383 | B2 * | 12/2018 | Lee | H01L 27/1251 |
| 10,777,159 | B2 | 9/2020 | Takeuchi et al. | |
| 10,957,755 | B2 * | 3/2021 | Han | H10K 59/131 |
| 11,222,941 | B2 | 1/2022 | Park et al. | |
| 2022/0199028 | A1 * | 6/2022 | Wang | H10K 59/1315 |
| 2022/0208130 | A1 * | 6/2022 | Park | H10K 59/131 |
| 2023/0086927 | A1 * | 3/2023 | Han | G09G 3/3266 |

FOREIGN PATENT DOCUMENTS

| | | |
|---|---|---|
| KR | 10-2017-0057832 | 5/2017 |
| KR | 10-1969071 | 8/2019 |
| KR | 10-2020-0060941 | 6/2020 |
| KR | 10-2020-0098779 | 8/2020 |

* cited by examiner

DISPLAY DEVICE

CROSS-REFERENCE TO RELATED APPLICATION(S)

The application claims priority to and benefits of Korean Patent Application No. 10-2021-0014398 under 35 U.S.C. § 119, filed Feb. 1, 2021 in the Korean Intellectual Property Office (KIPO), the entire contents of which are incorporated herein by reference.

BACKGROUND

1. Technical Field

Embodiments of the disclosure relate to a display device.

2. Discussion of the Related Art

In recent years, interest in information displays has increased. Accordingly, research and development in the technical fields related to display devices has been continuously conducted.

SUMMARY

An aspect of the disclosure is to provide a display device capable of reducing a non-display area and improving image quality.

Aspects of the disclosure are not limited to the above, and other aspects that are not mentioned will be clearly understood by those skilled in the art from the following description.

A display device according to an embodiment of the disclosure may include gate lines and data lines that are disposed in a display area, pixels disposed in the display area, the pixels being electrically connected to the gate lines, the data lines, a first power source line, and a second power source line, a driving circuit supplying gate signals and data signals to the gate lines and the data lines, the driving circuit including a first circuit element disposed in the display area between the pixels, and a conductive pattern disposed in the display area and overlapping the first circuit element, the conductive pattern electrically connected to the second power source line. Each of the pixels may include a first electrode electrically connected to the first power source line, a second electrode electrically connected to the second power source line, and at least one light emitting element disposed between the first electrode and the second electrode. The conductive pattern, the first electrode, and the second electrode may be disposed on a same layer.

In an embodiment, the display area may include a first clock line electrically connected to the first circuit element and transmitting a first clock signal, and the conductive pattern may overlap the first clock line.

In an embodiment, the first clock line may extend in a first direction and pass through an area between an i-th pixel row and an (i+1)th pixel row of the display area.

In an embodiment, the first circuit element may be disposed in a non-pixel area between two unit pixel areas disposed parallel to each other in the i-th pixel row, and the first clock line may be disposed between the second power source line connected to the pixels in the i-th pixel row and the first power source line connected to the pixels in the (i+1)th pixel row.

In an embodiment, the conductive pattern may be a separate pattern on the first clock line and on the first circuit element so as not to overlap the pixels.

In an embodiment, the display area may include at least one gate line adjacent to the first circuit element, and the conductive pattern may overlap the at least one gate line.

In an embodiment, the driving circuit may further include a second circuit element disposed in the display area adjacent to the first circuit element, and the conductive pattern may overlap the first circuit element and the second circuit element.

In an embodiment, the conductive pattern may be adjacent to at least one pixel, and the conductive pattern and the second electrode of the at least one adjacent pixel may be integral with each other.

In an embodiment, the driving circuit may include a gate driver including circuit elements that may include the first circuit element and disposed between the pixels, the gate driver outputting the gate signals to the gate lines, and a data driver outputting the data signals to the data lines.

In an embodiment, the data driver may be disposed only at a side area of a display panel adjacent to a side of the display area.

In an embodiment, the gate driver may include an i-th stage including the first circuit element. The first circuit element may be a transistor connected to a first clock line transmitting a first clock signal and outputting an i-th gate signal to an i-th gate line using the first clock signal.

In an embodiment, the display area may include pixel groups positioned in each unit pixel area. The gate lines may include a first scan line connected to even-numbered pixel groups positioned in the i-th pixel row of the display area, and a second scan line connected to odd-numbered pixel groups positioned in the i-th pixel row.

In an embodiment, the i-th pixel row may include a first pixel group including pixels connected to first data lines and the first scan line, a second pixel group disposed at a first side of the first pixel group and including pixels connected to second data lines and the second scan line, a third pixel group disposed at a second side of the first pixel group and including pixels connected to the first data lines and the second scan line, and a fourth pixel group disposed at a first side of the second pixel group and including pixels connected to the second data lines and the first scan line.

In an embodiment, the first circuit element may be disposed between the first pixel group and the second pixel group, the first data lines may be disposed between the first pixel group and the third pixel group, and the second data lines may be disposed between the second pixel group and the fourth pixel group.

In an embodiment, the display area may include a first pixel group and a second pixel group each including pixels, and the first circuit element may be disposed between a first unit pixel area in which the first pixel group may be disposed and a second unit pixel area in which the second pixel group may be disposed.

In an embodiment, the display area may further include a fifth pixel group and a sixth pixel group each including pixels, and the driving circuit may further include a second circuit element disposed between a unit pixel area in which the fifth pixel group may be disposed and another unit pixel area in which the sixth pixel group may be disposed.

In an embodiment, each of the pixels may include a pixel circuit connected to each gate line, each data line, and the first power source line and including a driving transistor, and an emission part electrically connected between an electrode of the driving transistor and the second power source line, the emission part including the first electrode, the second electrode, and the at least one light emitting element.

In an embodiment, the first circuit element may include a first electrode connected to a first clock line. The first electrode of the first circuit element, the first clock line, and the electrode of the driving transistor may be disposed on a same layer.

In an embodiment, the display area may include a first pixel, a second pixel, and a third pixel that are disposed in a first unit pixel area. Emission parts of the first pixel, the second pixel, and the third pixel may be disposed in a first direction in the first unit pixel area, and pixel circuits of the first pixel, the second pixel, and the third pixel may be disposed in a second direction in the first unit pixel area.

In an embodiment, the emission part of the first pixel may overlap the pixel circuits of the first pixel, the second pixel, and the third pixel.

Details of other embodiments are included in the detailed description and drawings.

BRIEF DESCRIPTION OF THE DRAWINGS

The accompanying drawings, which are included to provide a further understanding of the disclosure, and are incorporated in and constitute a part of this specification, illustrate embodiments, and, together with the description, serve to explain principles of the disclosure.

DETAILED DESCRIPTION OF THE ILLUSTRATED EMBODIMENTS

Figure 1:
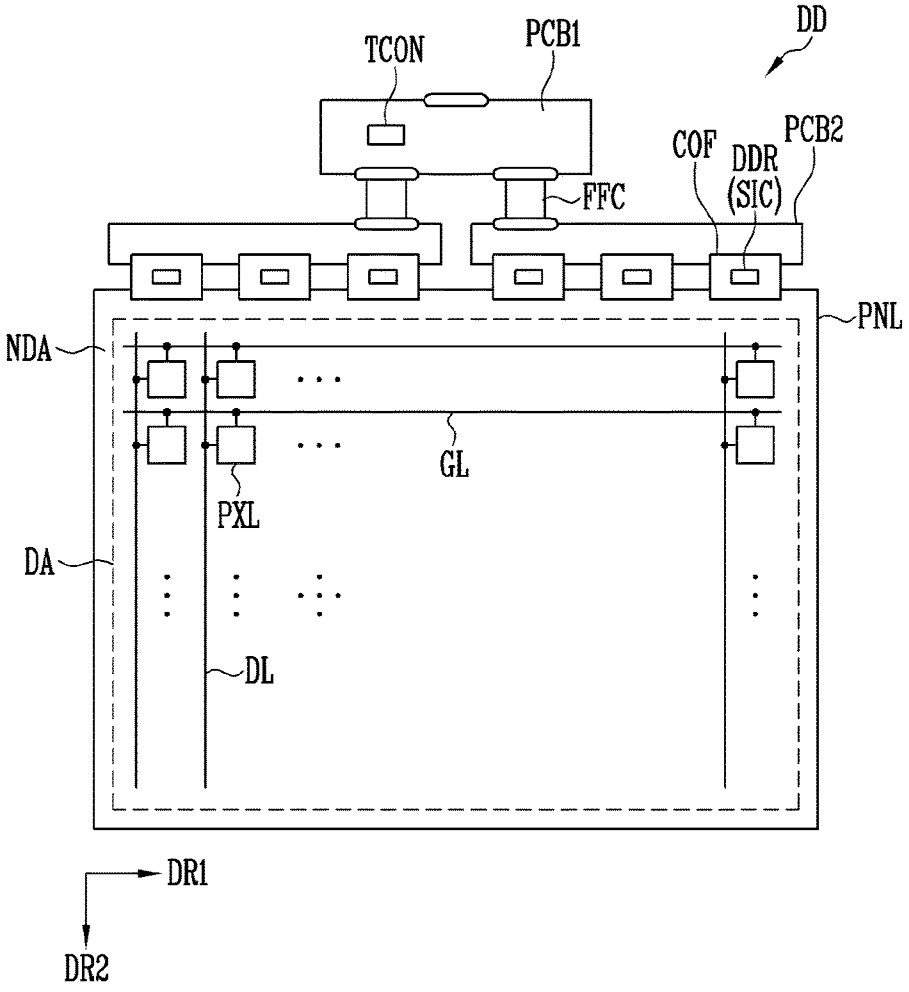
FIG. 1 is a schematic plan view illustrating a display device according to an embodiment.

The disclosure may be modified in various ways and may have various forms, and specific embodiments will be illustrated in the drawings and described in detail herein. In the following description, the singular forms may also include the plural forms unless the context clearly includes only the singular, and vice versa.

The disclosure is not limited to the embodiments disclosed below, and may be changed and implemented in various forms. Each of the embodiments disclosed below may be implemented alone or in combination with at least one of other embodiments.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

In the drawings, some elements which may not be directly related to the features of the disclosure may be omitted so as to clearly focus the disclosure. Elements in the drawings may be shown to be exaggerated in size or proportion. Throughout the drawings, the same or similar elements will be given by the same reference numerals and symbols as much as possible even though they may be shown in different drawings, and repetitive descriptions may be omitted.

It will be understood that the terms "connected to" or "coupled to" may include a physical or electrical connection or coupling.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic plan view illustrating a display device DD according to an embodiment.

Referring to FIG. 1, the display device DD may include gate lines GL, data lines DL, pixels PXL, and a driving circuit for driving the pixels PXL. The gate lines GL, the data lines DL, and the pixels PXL may be disposed (e.g., arranged) in a display area DA of a display panel PNL. The driving circuit may supply gate signals and data signals to the gate lines GL and the data lines DL, respectively. To this end, the driving circuit may include a gate driver and data driver DDR, and a timing controller TCON for controlling the gate driver and data driver DDR. In an embodiment, at least a portion of the driving circuit, for example, the gate driver, may be provided inside the display panel PNL.

Each gate line GL may extend along a first direction DR1 in the display area DA and may be connected to the pixels PXL arranged in at least one pixel row. The gate lines GL may be connected between the gate driver and the pixels PXL, and may include scan lines. The scan lines may be signal lines to which scan signals for selecting the pixels PXL to which the data signals are to be supplied are applied. For example, the scan signals output from the gate driver may be transferred to the pixels PXL through the scan lines. The gate lines GL may selectively further include control lines for supplying other types of control signals for controlling the operation of the pixels PXL.

Each data line DL may extend along a second direction DR2 in the display area DA and may be connected to the pixels PXL arranged in at least one pixel column. For example, the data lines DL may be arranged in the display area DA to cross the gate lines GL. The data lines DL may be connected between the data driver DDR and the pixels PXL, and the data signals output from the data driver DDR may be transferred to the pixels PXL through the data lines DL.

Each pixel PXL may be connected to at least one gate line GL and at least one data line DL. The pixels PXL may receive the data signals from the data lines DL in case that the gate signals, particularly the scan signals, are supplied from the gate lines GL. The pixels PXL may emit light with luminance corresponding to the data signals.

The gate driver may be connected to the pixels PXL through the gate lines GL, and may output the gate signals to the gate lines GL in response to a gate control signal supplied from the timing controller TCON. The gate driver may include a scan driver that outputs the scan signals to the scan lines. The scan driver may include stages for sequentially outputting the scan signals to the scan lines.

In an embodiment, the gate driver (or a portion of the gate driver) may be formed inside the display area DA. For example, stages included in the gate driver and circuit elements (for example, transistors and capacitors of each stage) constituting the stages may be formed inside the display area DA together with the pixels PXL. For example, the circuit elements of the gate driver may be distributed and disposed in non-pixel areas between the pixels PXL.

In case that the gate driver is formed inside the display panel PNL, since there may be no need to provide a separate gate drive IC, manufacturing cost of the display device DD can be reduced. In case that the gate driver is formed inside the display area DA, a non-display area NDA of the display panel PNL can be reduced.

The data driver DDR may be connected to the pixels PXL through the data lines DL, and may output the data signals to the data lines DL in response to image data and a data control signal supplied from the timing controller TCON. To this end, the data driver DDR may include a data signal generator that generates the data signals corresponding to an image signal of each frame, and output buffers for outputting the data signals to the data lines DL.

In an embodiment, the data driver DDR may be provided in the non-display area NDA outside the display area DA. The non-display area NDA may be an area other than the display area DA.

For example, the data driver DDR may include one or more source drive ICs SIC, and the source drive ICs SIC may be mounted on a flexible circuit board, for example, a chip on film (COF), or may be mounted on the non-display area NDA of the display panel PNL through a chip on glass (COG) process. In other embodiments, at least a portion of the data driver DDR may be formed inside the display panel PNL together with the pixels PXL.

In an embodiment, the data driver DDR may be provided and/or disposed only on the display panel PNL so as to be adjacent to a side of the display area DA. For example, the data driver DDR may be disposed only in an upper area (or a lower area) of the display area DA. In this case, in the non-display area NDA of the display panel PNL, the driving circuit (or a connection unit connected to the driving circuit) may not be positioned in an area, for example, non-display areas NDA positioned in the left, right, and lower area of the display area DA, other than the area in which the data driver DDR may be positioned.

The timing controller TCON may supply the gate control signal to the gate driver to control the operation of the gate driver. The timing controller TCON may supply the image data and the data control signal to the data driver DDR to control the operation of the data driver DDR. In an embodiment, the timing controller TCON may be mounted on a first printed circuit board PCB1, and may be connected to the source drive ICs SIC through a flexible flat cable FFC and a second printed circuit board PCB2 (for example, a source PCB).

Figure 2:
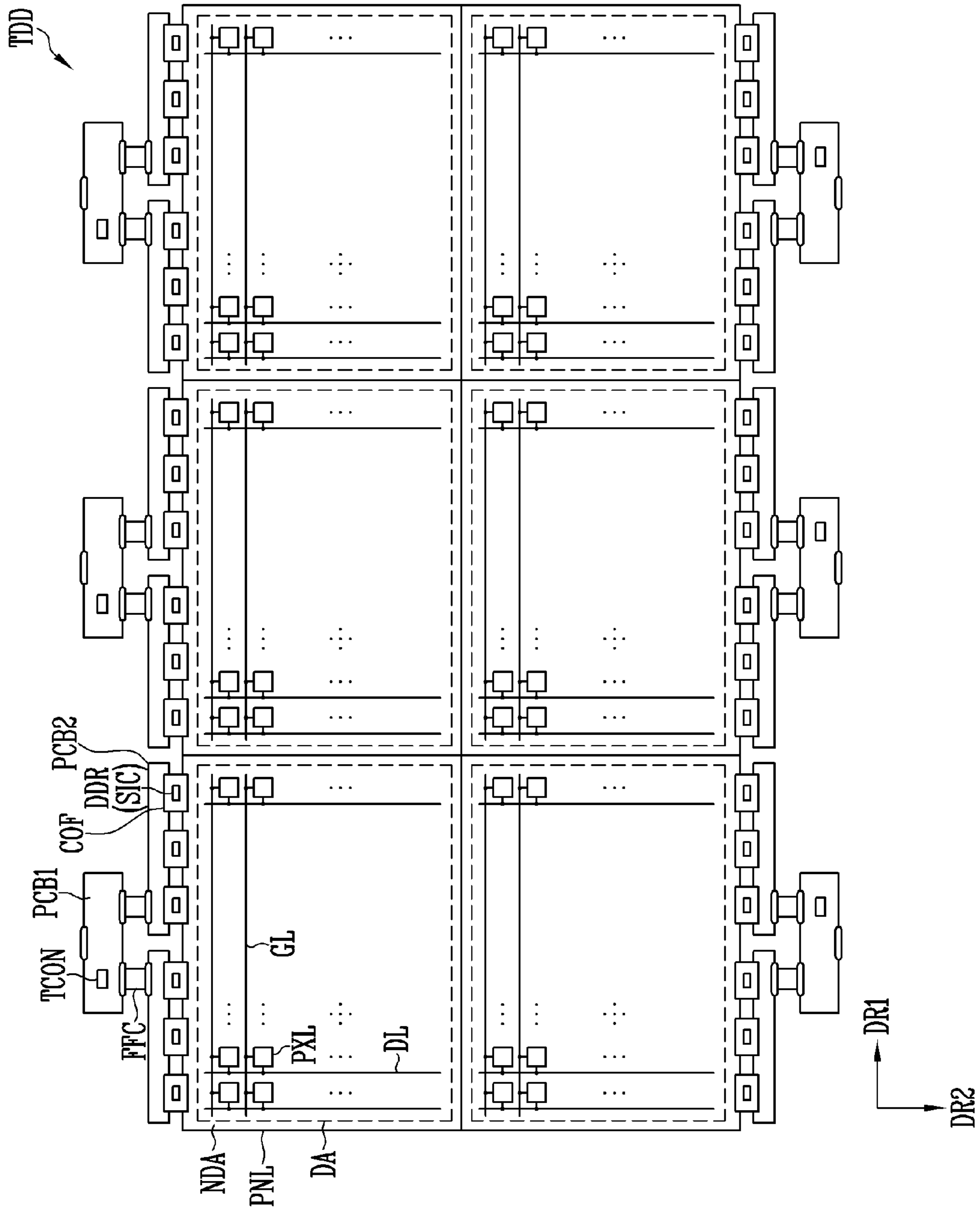
FIG. 2 is a schematic plan view illustrating a tiling display device according to an embodiment.

FIG. 2 is a schematic plan view illustrating a tiling display device TDD according to an embodiment. For example, FIG. 2 shows the tiling display device TDD using the display device DD of FIG. 1.

Referring to FIGS. 1 and 2, the tiling display TDD having a larger screen may be configured by using a plurality of display devices DD. For example, the plurality of display devices DD may be arranged along the first direction DR1 and/or the second direction DR2 to configure the tiling display device DD that implements an extra-large screen.

In an embodiment, each display device DD constituting the tiling display device DD may include a driving circuit provided only inside the display area DA and/or at a side corresponding to one specific side of the display panel PNL. For example, each display device DD may be manufactured such that the driving circuit may be provided and/or connected only on a first surface corresponding to an upper area (or a lower area) of the non-display area NDA of the display panel PNL, and the driving circuit may not be positioned or connected on second, third, and fourth surfaces corresponding to the left, right and lower areas (or upper areas) of the display panel PNL. Accordingly, the non-display areas NDA of the second, third, and fourth surfaces of the display panel PNL may have a reduced and/or minimized width. In other embodiments, in case that the non-display areas NDA of the second, third, and fourth surfaces of the display panel PNL have a narrow width that may be difficult to recognize by the human eye, it may be considered that the second, third, and fourth surfaces of the display panel PNL do not substantially include the non-display area NDA.

In case that the tiling display device TDD is configured using the display devices DD, it may be possible to prevent or minimize a boundary between the display devices DD from being visually recognized. Accordingly, a seamless tiling display device TDD can be configured.

Figure 3:
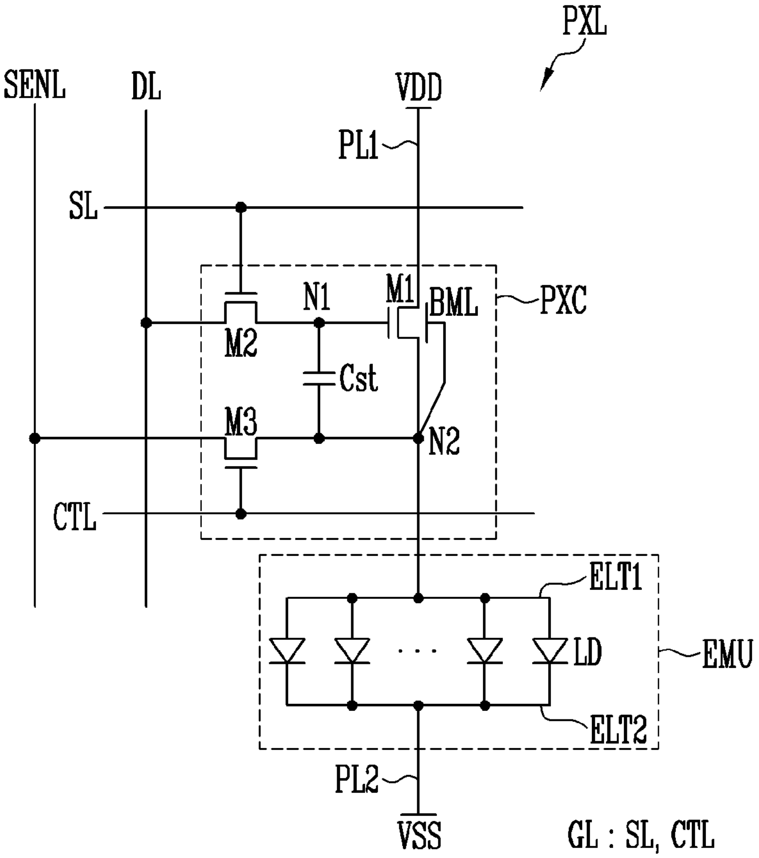
FIG. 3 is a schematic circuit diagram illustrating a pixel according to an embodiment.

FIG. 3 is a schematic circuit diagram illustrating a pixel PXL according to an embodiment. For example, the pixel PXL shown in FIG. 3 may be any one of the pixels PXL shown in FIGS. 1 and 2, and the pixels PXL arranged in each display area DA may be configured to be substantially the same as or similar to each other.

Referring to FIG. 3, the pixel PXL may be connected to at least one gate line GL, at least one data line DL, a first power source line PL1, and a second power source line PL2. Also, the pixel PXL may be selectively further connected to at least one other power source line and/or signal line.

The pixel PXL may include an emission unit EMU for generating light having a luminance corresponding to a data signal. Also, the pixel PXL may selectively further include a pixel circuit PXC for driving the emission unit EMU.

The pixel circuit PXC may be connected to a gate line GL and a data line DL, and may be connected between the first power source line PL1 and the emission unit EMU. For example, the pixel circuit PXC may be connected to a scan line SL to which a scan signal may be supplied, the data line DL to which the data signal may be supplied, the first power source line PL1 to which a first power source VDD may be supplied, and a first electrode ELT1 of the emission unit EMU. The pixel circuit PXC may be further selectively connected to a control line CTL to which a control signal may be supplied and a sensing line SENL connected to a reference power source (or an initialization power source) or a sensing circuit in response to a display period or a sensing period. In this case, the gate line GL may include the scan line SL and the control line CTL.

The pixel circuit PXC may include at least one transistor and a capacitor. For example, the pixel circuit PXC may include a first transistor M1, a second transistor M2, a third transistor M3, and a capacitor Cst.

The first transistor M1 may be connected between the first power source line PL1 and a second node N2. The second node N2 may be a node to which the pixel circuit PXC and the emission unit EMU may be connected. For example, the second node N2 may be a node (also referred to as a source node of the first transistor M1 or an anode node of the pixel PXL) to which a first electrode (for example, a source electrode) of the first transistor M1 and the first electrode ELT1 of the emission unit EMU may be connected. A gate electrode of the first transistor M1 may be connected to a first node N1. The first transistor M1 may control a driving current supplied to the emission unit EMU in response to a voltage of the first node N1. For example, the first transistor M1 may be a driving transistor of the pixel PXL.

In an embodiment, the first transistor M1 may selectively include a bottom metal layer BML (or a back gate electrode). The gate electrode and the bottom metal layer BML of the first transistor M1 may overlap each other with an insulating layer interposed therebetween. In an embodiment, the bottom metal layer BML may be connected to one electrode of the first transistor M1, for example, the source electrode.

In an embodiment in which the first transistor M1 includes the bottom metal layer BML, a back-biasing technique (or sync technique) in which a threshold voltage of the first transistor M1 may be moved in a negative or positive direction by applying a back-biasing voltage to the bottom metal layer BML of the first transistor M1 may be applied. In case that the bottom metal layer BML may be disposed under a semiconductor pattern constituting a channel of the first transistor M1 to block light incident on the semiconductor pattern, operating characteristics of the first transistor M1 may be stabilized.

The second transistor M2 may be connected between the data line DL and the first node N1. A gate electrode of the second transistor M2 may be connected to the scan line SL. In case that the scan signal having a gate-on voltage (for example, a high level voltage) may be supplied from the scan line SL, the second transistor M2 may be turned on to connect the data line DL and the first node N1.

The data signal of a corresponding frame may be supplied to the data line DL for each frame period. The data signal may be transferred to the first node N1 through the second transistor M2 during a period in which the scan signal having the gate-on voltage may be supplied. For example, the second transistor M2 may be a switching transistor for transferring each data signal to the inside of the pixel PXL.

An electrode of the capacitor Cst may be connected to the first node N1 and another electrode may be connected to the second node N2. The capacitor Cst may charge a voltage corresponding to the data signal supplied to the first node N1 during each frame period.

The third transistor M3 may be connected between the second node N2 and the sensing line SENL. A gate electrode of the third transistor M3 may be connected to the control line CTL. In case that the control signal having a gate-on voltage (for example, a high level voltage) is supplied from the control line CTL, the third transistor M3 may be turned on to transfer a reference voltage (or an initialization voltage) supplied to the sensing line SENL to the second node N2 or to transfer a voltage of the second node N2 to the sensing line SENL. The voltage of the second node N2 transferred to the sensing circuit through the sensing line SENL may be provided to an external circuit (for example, the timing controller TCON) and may be used to compensate for deviation in characteristics of the pixels PXL.

In FIG. 3, all transistors included in the pixel circuit PXC are shown as N-type transistors, but embodiments are not limited thereto. For example, at least one of the first, second, and third transistors M1, M2, and M3 may be changed to a P-type transistor. The structure and driving method of the pixel PXL may be variously changed according to embodiments.

The emission unit EMU may include the first electrode ELT1, a second electrode ELT2, and at least one light emitting element LD connected between the first power source line PL1 and the second power source line PL2. For example, the emission unit EMU may include the first electrode ELT1 connected to the first power source line PL1 through the first transistor M1, the second electrode ELT2 connected to the second power source line PL2, and at least one light emitting element LD connected between the first electrode ELT1 and the second electrode ELT2. In an embodiment, the emission unit EMU may include a plurality of light emitting elements LD connected in parallel between the first electrode ELT1 and the second electrode ELT2.

The first power source VDD supplied to the first power source line PL1 and a second power source VSS supplied to the second power source line PL2 may have different potentials. For example, the first power source VDD may be a high-potential pixel power source, and the second power source VSS may be a low-potential pixel power source. A potential difference between the first power source VDD and the second power source VSS may be set to be greater than or equal to a threshold voltage of the light emitting element LD. In this case, the first electrode ELT1 may be an anode electrode of the emission unit EMU, and the second electrode ELT2 may be a cathode electrode of the emission unit EMU.

Each light emitting element LD may be connected in a forward direction between the first power source VDD and the second power source VSS to configure each effective light source. These effective light sources may be gathered to form the emission unit EMU of the pixel PXL.

The light emitting elements LD may emit light with luminance corresponding to the driving current supplied through the pixel circuit PXC. During each frame period, the pixel circuit PXC may supply the driving current corresponding to the data signal to the emission unit EMU. The driving current supplied to the emission unit EMU may be divided and flow through the light emitting elements LD. Accordingly, while each light emitting element LD emits light with a luminance corresponding to the current flowing therethrough, the emission unit EMU may emit light with luminance corresponding to the driving current.

In an embodiment, the emission unit EMU may further include at least one ineffective light source. For example, the emission unit EMU may further include an ineffective light emitting element that may be aligned in a reverse direction between the first and second electrodes ELT1 and ELT2, or may not be fully connected between the first and second electrodes ELT1 and ELT2.

FIG. 3 shows an embodiment in which the pixel PXL includes the emission unit EMU having a parallel structure, but embodiments are not limited thereto. For example, in another embodiment, the pixel PXL may include the emission unit EMU having a serial structure or a serial/parallel structure. In this case, the emission unit EMU may include a plurality of light emitting elements LD connected in series or in series/parallel between the first electrode ELT1 and the second electrode ELT2. In still another embodiment, the pixel PXL may include only one light emitting element LD connected between the first electrode ELT1 and the second electrode ELT2.

Figure 4:
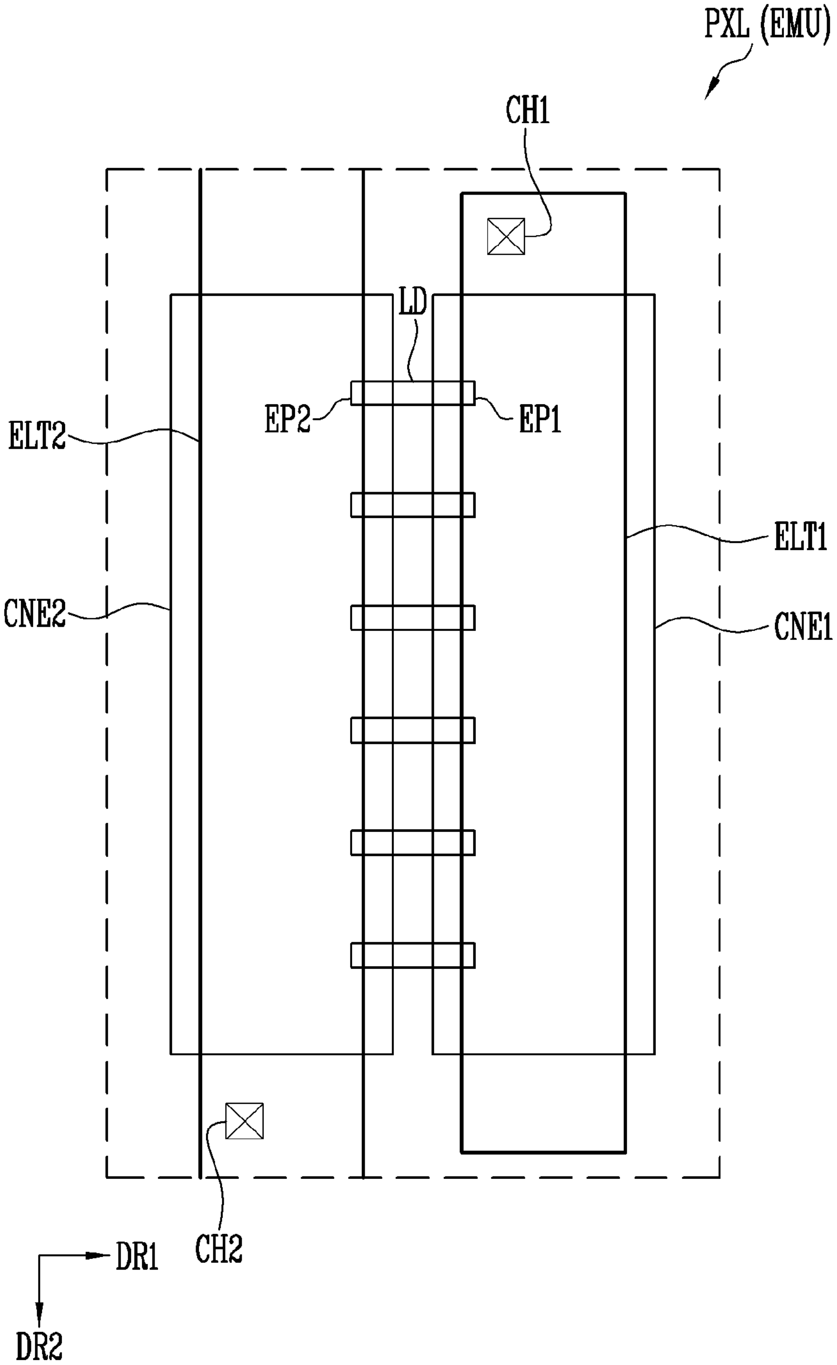
FIG. 4 is a schematic plan view illustrating an emission unit of a pixel according to an embodiment.

FIG. 4 is a schematic plan view illustrating an emission unit EMU of a pixel PXL according to an embodiment of the disclosure. For example, as in the embodiment of FIG. 3, FIG. 4 shows a structure of the emission unit EMU including the first electrode ELT1, the second electrode ELT2, and the plurality of light emitting elements LD connected in parallel between the first and second electrodes ELT1 and ELT2.

FIG. 4 shows an embodiment in which the emission unit EMU may be connected to a power source line (for example, the first power source line PL1 and/or the second power source line PL2), a circuit element (for example, at least one circuit element constituting the pixel circuit PXC of a corresponding pixel PXL) and/or a signal line (for example, the scan line SL and/or the data line DL) through first and second contact holes CH1 and CH2. However, embodiments are not limited thereto. For example, in another embodiment, at least one of the first and second electrodes ELT1 and ELT2 of each pixel PXL may be directly connected to a power source line and/or signal line without passing through a contact hole and/or an intermediate wiring.

Referring to FIGS. 3 and 4, the emission unit EMU may include the first electrode ELT1, the second electrode ELT2, and the light emitting elements LD disposed and/or aligned between the first and second electrodes ELT1 and ELT2. The expression that the light emitting elements LD may be disposed and/or aligned between the first and second electrodes ELT1 and ELT2 may mean that at least one area of each of the light emitting elements LD may be positioned in an area between the first and second electrodes ELT1 and ELT2 in plan view.

The emission unit EMU may further include a first contact electrode CNE1 and a second contact electrode CNE2 connected to the light emitting elements LD. The pixel PXL may further include at least one other electrode, conductive pattern, and/or insulating pattern.

The first electrode ELT1 and the second electrode ELT2 may be spaced apart from each other. For example, the first electrode ELT1 and the second electrode ELT2 may be disposed to be spaced apart from each other in the same layer along the first direction DR1, and may extend along the second direction DR2, respectively. The first direction DR1 and the second direction DR2 may be directions that intersect each other (for example, orthogonal to each other). In an embodiment, the first direction DR1 may be a horizontal direction (or a row direction), and the second direction DR2 may be a vertical direction (or a column direction). However, the shape, size, position, and/or mutual arrangement structure of the first electrode ELT1 and the second electrode ELT2 may be variously changed according to embodiments.

FIG. 4 shows an embodiment in which the emission unit EMU includes one first electrode ELT1 and one second electrode ELT2, but embodiments are not limited thereto. For example, the number of first and/or second electrodes ELT1 and ELT2 provided to each emission unit EMU may be changed. In case that a plurality of first electrodes ELT1 are disposed in one emission unit EMU, the first electrodes ELT1 may be integrally or non-integrally connected to each other. Similarly, in case that a plurality of second electrodes ELT2 are disposed in one emission unit EMU, the second electrodes ELT2 may be integrally or non-integrally connected to each other.

Each of the first electrode ELT1 and the second electrode ELT2 may have a pattern separated for each pixel PXL or a pattern connected in common within the plurality of pixels PXL. For example, the first electrode ELT1 may have an independent pattern for each pixel PXL, and may be separated from the first electrodes ELT1 of adjacent pixels PXL. The second electrode ELT2 may have an independent pattern for each pixel PXL or may be integrally connected to the second electrodes ELT2 of adjacent pixels PXL.

In a process of forming the pixel PXL, in particular, before the alignment of the light emitting elements LD may be completed, the first electrodes ELT1 of the pixels PXL may be connected to each other, and the second electrodes ELT2 of the pixels PXL may be connected to each other. For example, before the alignment of the light emitting elements LD may be completed, the first electrodes ELT1 of the pixels PXL may be integrally or non-integrally connected to each other to form a first alignment line, and the second electrodes ELT2 of the pixels PXL may be integrally or non-integrally connected to each other to form a second alignment line.

The first alignment line and the second alignment line may receive a first alignment signal and a second alignment signal, respectively, in a step of aligning the light emitting elements LD. The first and second alignment signals may have different waveforms, potentials and/or phases. Accordingly, an electric field may be formed between the first and second alignment lines, so that the light emitting elements LD can be aligned between the first and second alignment lines. After the alignment of the light emitting elements LD may be completed, the first electrodes ELT1 of the pixels PXL may be separated from each other by cutting at least the first alignment line. Accordingly, the pixels PXL can be individually driven.

The first electrode ELT1 may be electrically connected to a circuit element (for example, at least one transistor constituting the pixel circuit PXC), power source line (for example, the first power source line PL1) and/or signal line (for example, the scan line SL, the data line DL, or a control line) through the first contact hole CH1. In another embodiment, the first electrode ELT1 may be directly connected to a power source line or signal line.

In an embodiment, the first electrode ELT1 may be electrically connected to a circuit element (for example, the first transistor M1 of the pixel circuit PXC) through the first contact hole CH1, and may be electrically connected to a first wiring through the circuit element. The first wiring may be the first power source line PL1.

The second electrode ELT2 may be electrically connected to a circuit element (for example, at least one transistor constituting the pixel circuit PXC), power source line (for example, the second power source line PL2), and/or signal line (for example, the scan line SL, the data line DL, or a control line) through the second contact hole CH2. In another embodiment, the second electrode ELT2 may be directly connected to a power source line or signal line.

In an embodiment, the second electrode ELT2 may be electrically connected to a second wiring through the second contact hole CH2. The second wiring may be the second power source line PL2.

Each of the first and second electrodes ELT1 and ELT2 may be composed of a single layer or multiple layers. For example, each of the first and second electrodes ELT1 and ELT2 may include at least one reflective electrode layer including a reflective conductive material, and may selectively further include at least one transparent electrode layer and/or conductive capping layer. The reflective conductive material may be a metal having a high reflectance in a visible light wavelength band, for example, at least one of metal materials such as aluminum (Al), gold (Au), and silver (Ag), but embodiments are not limited thereto.

The light emitting elements LD may be aligned between the first electrode ELT1 and the second electrode ELT2. For example, the light emitting elements LD may be aligned and/or connected to each other in parallel between the first electrode ELT1 and the second electrode ELT2.

In an embodiment, each light emitting element LD may be aligned in the first direction DR1 between the first electrode ELT1 and the second electrode ELT2, and may be electrically connected to the first and second electrodes ELT1 and ELT2. FIG. 4 shows an embodiment in which all of the light emitting elements LD may be uniformly aligned in the first direction DR1, but embodiments are not limited thereto. For example, at least one of the light emitting elements LD may be arranged in a diagonal direction inclined with respect to the first and second directions DR1 and DR2 between the first and second electrodes ELT1 and ELT2.

In an embodiment, each light emitting element LD may be an ultra-small inorganic light emitting diode (for example, having a size as small as nano-scale to micro-scale) using a material having an inorganic crystal structure. For example, each light emitting element LD may be the ultra-small inorganic light emitting diode manufactured by growing a nitride-based semiconductor and etching the nitride-based semiconductor into a rod shape. However, the type, size, shape, structure, and/or number of the light emitting element(s) LD constituting each emission unit EMU may be changed.

Each light emitting element LD may include a first end EP1 and a second end EP2. The first end EP1 may be disposed adjacent to the first electrode ELT1, and the second end EP2 may be disposed adjacent to the second electrode ELT2. The first end EP1 may or may not overlap the first electrode ELT1. The second end EP2 may or may not overlap the second electrode ELT2.

In an embodiment, the first end EP1 of each of the light emitting elements LD may be electrically connected to the first electrode ELT1 through the first contact electrode CNE1. In another embodiment, the first end EP1 of each of the light emitting elements LD may be directly connected to the first electrode ELT1. In still another embodiment, the first end EP1 of each of the light emitting elements LD may be electrically connected only to the first contact electrode CNE1 and may not be connected to the first electrode ELT1. In this case, the first contact electrode CNE1 may constitute the anode electrode of the emission unit EMU, and the light emitting elements LD may be connected to a corresponding pixel circuit PXC through the first contact electrode CNE1.

Similarly, the second end EP2 of each of the light emitting elements LD may be electrically connected to the second electrode ELT2 through the second contact electrode CNE2. In another embodiment, the second end EP2 of each of the light emitting elements LD may be directly connected to the second electrode ELT2. In still another embodiment, the second end EP2 of each of the light emitting elements LD may be electrically connected only to the second contact electrode CN2 and may not be connected to the second electrode ELT2. In this case, the second contact electrode CNE2 may constitute the cathode electrode of the emission unit EMU, and the light emitting elements LD may be connected to the second power source line PL2 through the second contact electrode CNE2.

The light emitting elements LD may be prepared in a form dispersed in a solution, and may be supplied to an emission area of each pixel PXL by an inkjet method or a slit coating method. In a state in which the light emitting elements LD may be supplied to each emission area, in case that an alignment signal is applied to the first and second electrodes ELT1 and ELT2 of the pixels PXL (or the first and second alignment lines), the light emitting elements LD may be aligned between the first and second electrodes ELT1 and ELT2. After the light emitting elements LD may be aligned, the solvent may be removed through a drying process or the like.

The first contact electrode CNE1 and the second contact electrode CNE2 may be selectively formed on first ends EP1 and second ends EP2 of the light emitting elements LD, respectively.

The first contact electrode CNE1 may be disposed on the first ends EP1 to be electrically connected to the first ends EP1 of the light emitting elements LD. The first contact electrode CNE1 may be disposed on the first electrode ELT1 to be electrically connected to the first electrode ELT1. The first ends EP1 of the light emitting elements LD may be electrically connected to the first electrode ELT1 through the first contact electrode CNE1.

The second contact electrode CNE2 may be disposed on the second ends EP2 to be electrically connected to the second ends EP2 of the light emitting elements LD. The second contact electrode CNE2 may be disposed on the second electrode ELT2 to be electrically connected to the second electrode ELT2. The second ends EP2 of the light emitting elements LD may be electrically connected to the second electrode ELT2 through the second contact electrode CNE2.

Figure 5:
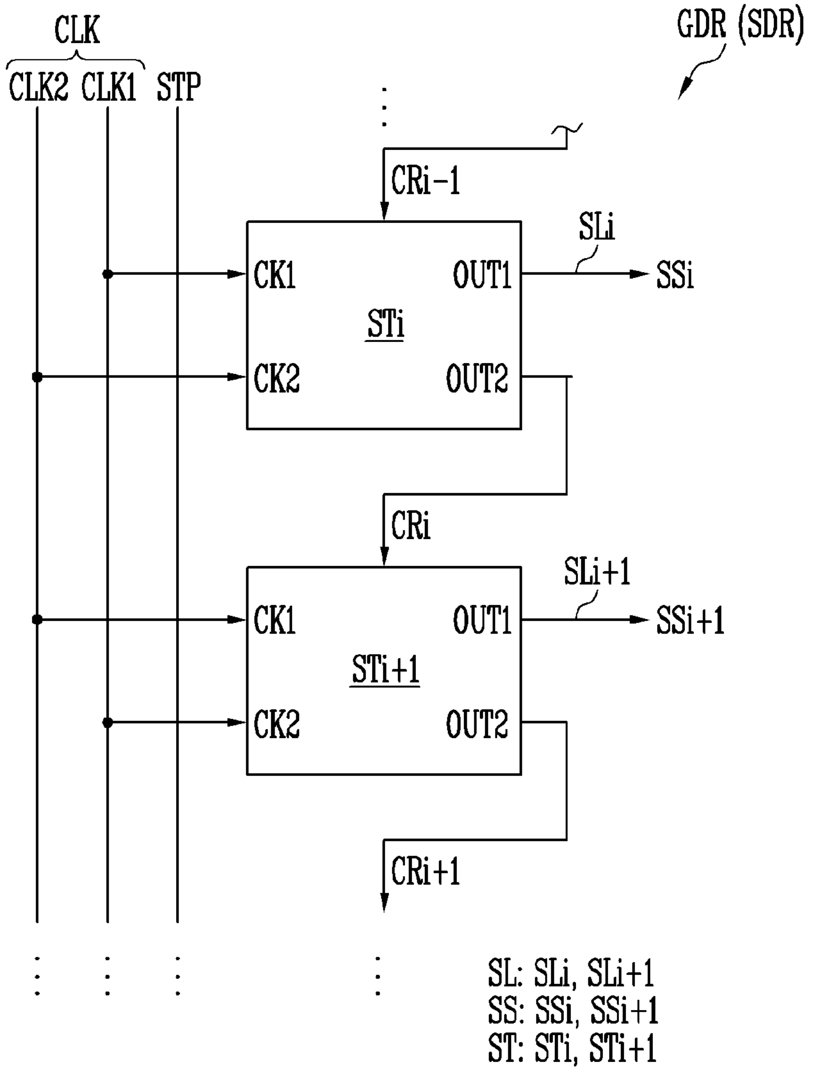
FIG. 5 is a schematic block diagram illustrating a gate driver according to an embodiment.

FIG. 5 is a schematic block diagram illustrating a gate driver GDR according to an embodiment. For example, FIG. 5 shows an example of a scan driver SDR for sequentially outputting scan signals SS to the scan lines SL as a component included in the gate driver GDR.

Referring to FIGS. 1 to 5, the gate driver GDR may include stages ST for outputting the scan signals SS to the scan lines SL. For convenience of explanation, FIG. 5 shows only an i-th stage STi and an (i+1)th stage STi+1 for outputting an i-th scan signal SSi and an (i+1)th scan signal SSi+1 to an i-th scan line SLi and an (i+1)th scan line SLi+1 of the display area DA, respectively, where i may be a natural number.

The stages ST may be dependently connected to an input terminal of a start pulse STP. For example, a first stage of the gate driver GDR may be connected to the input terminal of the start pulse STP, and a second stage of the gate driver GDR may be connected to a second output terminal OUT2 of the first stage. In this way, an i-th stage of the scan driver SDR may be connected to the input terminal of the start pulse STP or the second output terminal OUT2 of a previous stage (for example, an (i−1)th stage). The stages ST may further include at least one power source terminal, and may be driven by a driving power source supplied from the power source terminal. The stages ST may further include a reset terminal to which a reset signal may be input, and the like.

The stages ST may sequentially output the scan signals SS to the scan lines SL using the start pulse STP and clock signals CLK.

In an embodiment, the clock signals CLK may include a first clock signal CLK1 and a second clock signal CLK2. The first clock signal CLK1 may be input to first clock terminals CK1 of odd-numbered stages and second clock terminals CK2 of even-numbered stages. The second clock signal CLK2 may be input to second clock terminals CK2 of odd-numbered stages and first clock terminals CK1 of even-numbered stages. However, the type, number, and/or supply method of the clock signals CLK may be changed according to the circuit configuration of the stages ST.

The first stage of the gate driver GDR may output a first scan signal and a first carry signal to a first output terminal OUT1 and the second output terminal OUT2, respectively, using the start pulse STP and the clock signals CLK. The first output terminal OUT1 of the first stage may be connected to a first scan line, and the second output terminal OUT2 may be connected to a next stage (for example, the second stage). Accordingly, the first scan signal may be supplied to the first scan line, and the first carry signal may be supplied to the next stage.

The second stage of the gate driver GDR may output a second scan signal to the first output terminal OUT1 and may output a second carry signal to the second output terminal OUT2 using the first carry signal and the clock signals CLK. The first output terminal OUT1 of the second stage may be connected to a second scan line, and the second output terminal OUT2 may be connected to a next stage (for example, a third stage). Accordingly, the second scan signal may be supplied to the second scan line, and the second carry signal may be supplied to the next stage.

In this way, the i-th stage of the gate driver GDR may output the i-th scan signal SSi to the i-th scan line SLi and may output an i-th carry signal CRi to the (i+1)th stage STi+1 using an (i−1)th carry signal CRi−1 (or the start pulse STP) and the clock signals CLK output from an (i−1)th stage STi−1. Similarly, the (i+1)th stage STi+1 of the gate driver GDR may output the (i+1)th scan signal SSi+1 to the (i+1)th scan line SLi+1 and may output an (i+1)th carry signal CRi+1 to an (i+2)th stage using the i-th carry signal CRi and the clock signals CLK.

Figure 6:
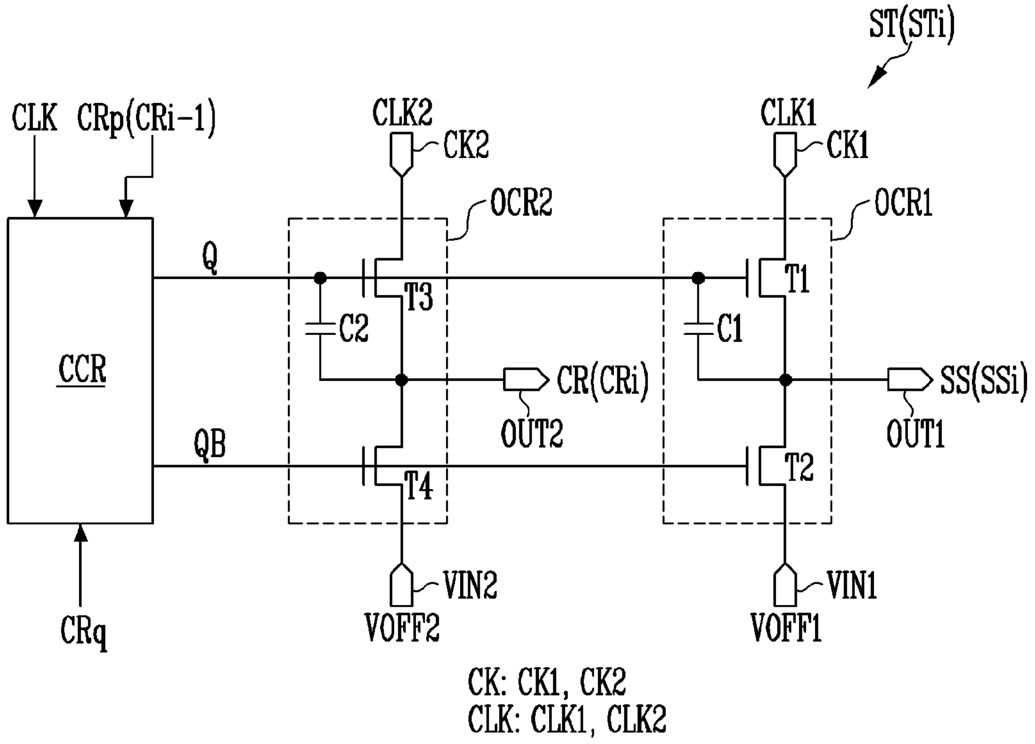
FIG. 6 is a schematic diagram illustrating an i-th stage of FIG. 5.

FIG. 6 is a schematic diagram illustrating a stage ST according to an embodiment, and shows the i-th stage STi of FIG. 5 as an example. According to embodiments, the stages ST provided in each gate driver GDR may be configured to be substantially the same or similar.

In the disclosure, the circuit configuration of each stage ST is not particularly limited, and may be variously changed according to embodiments. Accordingly, in each stage ST shown in FIG. 6, circuit elements for controlling voltages of a Q node and a QB node in response to a carry signal CRp of the previous stage or the start pulse STP may be omitted, and the configuration including the circuit elements is simplified and shown as a control circuit CCR block.

FIG. 6 shows a configuration of a first output circuit OCR1 and a second output circuit OCR2 for outputting each scan signal SS (for example, the i-th scan signal SSi) and each carry signal CR (for example, the i-th carry signal CRi) according to the voltages of the Q node and the QB node. However, the configurations of the first and second output circuits OCR1 and OCR2 may also be variously changed according to embodiments.

Referring to FIGS. 5 and 6, the stage ST may include the control circuit CCR, the first output circuit OCR1, and the second output circuit OCR2. Clock terminals CK (or clock lines) of the stage ST may include a first clock terminal CK1 (or a first clock line) and a second clock terminal CK2 (or a second clock line). The first clock signal CLK1 (a scan clock signal of the stage ST) may be input to the first clock terminal CK1, and the second clock signal CLK2 (a carry clock signal of the stage ST) may be input to the second clock terminal CK2. The start pulse STP or a previous carry signal CRp from the previous stage (for example, the (i−1)th carry signal CRi−1 or an (i−k)th carry signal CRi−k) may be input to the control circuit CCR of the stage ST, where k may be a natural number of 2 or more.

In an embodiment, the first clock signal CLK1 and the second clock signal CLK2 may be the same signal, and only the first clock terminal CK1 and the second clock terminal CK2 may be configured separately. In this case, each stage ST may simultaneously output the scan signal SSi and the carry signal CR to the first output terminal OUT1 and the second output terminal OUT2 in response to the first and second clock signals CLK1 and CLK2 (or substantially the same one clock signal CLK).

The control circuit CCR may receive the start pulse STP or the previous carry signal CRp, and at least one clock signal CLK (for example, the first clock signal CLK1, the second clock signal CLK2, and/or at least one other clock signal), and may control the voltages of the Q node and the QB node based thereon. For example, in case that the previous carry signal CRp has a logic low level (for example, a gate-off voltage or turn-off voltage level), the control circuit CCR may control the voltage of the QB node so that the voltage of the QB node becomes a logic high level (for example, a gate-on voltage or turn-on voltage level), and may maintain the voltage of the Q node to the gate-off voltage. In case that the previous carry signal CRp has a logic high level, the control circuit CCR may control the voltage of the Q node so that the voltage of the Q node becomes the logic high level, and may maintain the voltage of the QB node to the logic low level.

In an embodiment, the control circuit CCR may initialize the voltage of the Q node based on a next carry signal CRq (or an initialization signal) input from a subsequent stage (for example, the (i+1)th stage STi+1 or an (i+k)th stage). For example, the control circuit CCR may initialize the voltage of the Q node using the next carry signal CRq so that each stage ST outputs the carry signal CR and the scan signal SS having the logic high level in a corresponding horizontal period and does not output the carry signal CR and the scan signal SS having the logic high level after the corresponding horizontal period (for example, outputs the carry signal CR and the scan signal SS having the logic low level).

The first output circuit OCR1 may output the first clock signal CLK1 as the scan signal SS to the first output terminal OUT1 in response to the voltage of the Q node, and may pull-down or maintain the scan signal SS to a first logic low level in response to the voltage of the QB node. For example, in case that the voltage of the Q node is the logic high level and the voltage of the QB node is the logic low level, the first output circuit OCR1 may output the first clock signal CLK1 to the first output terminal OUT1. Conversely, in case that the voltage of the Q node is the logic low level and the voltage at the QB node is the logic high level, the first output circuit OCR1 may pull-down the voltage of the scan signal SS output to the first output terminal OUT1 to a first off voltage VOFF1 input from a first power source terminal VIN1, or may maintain the voltage of the scan signal SS to the first off voltage VOFF1. The first off voltage VOFF1 may be a voltage of a level capable of turning off the switching transistor (for example, the second transistor M2 of FIG. 3) of the pixel PXL.

The first output circuit OCR1 may include a first transistor T1 and a second transistor T2. The first output circuit OCR1 may further include a first capacitor C1.

The first transistor T1 may be connected between the first clock terminal CK1 and the first output terminal OUT1, and a gate electrode of the first transistor T1 may be connected to the Q node. The first transistor T1 may be turned on in case that the voltage of the Q node is the logic high level (for example, the gate-on voltage) to electrically connect the first clock terminal CK1 and the first output terminal OUT1. Accordingly, in case that the first transistor T1 is turned on, the first clock signal CLK1 may be output as the scan signal SS.

The second transistor T2 may be connected between the first output terminal OUT1 and the first power source terminal VIN1, and a gate electrode of the second transistor T2 may be connected to the QB node. The second transistor T2 may be turned on in case that the voltage of the QB node is the logic high level (for example, the gate-on voltage) to electrically connect the first power source terminal VIN1 and the first output terminal OUT1. Accordingly, in case that the second transistor T2 is turned on, the voltage of the scan signal SS may be maintained to the first off voltage VOFF1.

The first capacitor C1 may be connected between the gate electrode of the first transistor T1 and the first output terminal OUT1. The first capacitor C1 may be a boosting capacitor provided in the first output circuit OCR1 to stably output the scan signal SS having the logic high level.

The second output circuit OCR2 may output the second clock signal CLK2 as the carry signal CR to the second output terminal OUT2 in response to the voltage of the Q node, and may pull-down or maintain the carry signal CR to a second logic low level in response to the voltage of the QB node. For example, in case that the voltage of the Q node is the logic high level and the voltage of the QB node is the logic low level, the second output circuit OCR2 may output the second clock signal CLK2 to the second output terminal OUT2. Conversely, in case that the voltage of the Q node is the logic low level and the voltage at the QB node is the logic high level, the second output circuit OCR2 may pull-down the voltage of the carry signal CR output to the second output terminal OUT2 to a second off voltage VOFF2 input from a second power source terminal VIN2 or may maintain the voltage of the carry signal CR to the second off voltage VOFF2. The second off voltage VOFF2 may be a voltage of a level capable of turning off at least one transistor included in the control circuit CCR, and may be the same as or different from the first off voltage VOFF1.

The second output circuit OCR2 may include a third transistor T3 and a fourth transistor T4. The second output circuit OCR2 may further include a second capacitor C2.

The third transistor T3 may be connected between the second clock terminal CK2 and the second output terminal OUT2, and a gate electrode of the third transistor T3 may be connected to the Q node. The third transistor T3 may be turned on in case that the voltage of the Q node is the logic high level to electrically connect the second clock terminal CK2 and the second output terminal OUT2. Accordingly, in case that the third transistor T3 is turned on, the second clock signal CLK2 may be output as the carry signal CR.

The fourth transistor T4 may be connected between the second output terminal OUT2 and the second power source terminal VIN2, and a gate electrode of the fourth transistor T4 may be connected to the QB node. The fourth transistor T4 may be turned on in case that the voltage of the QB node is the logic high level to electrically connect the second power source terminal VIN2 and the second output terminal OUT2. Accordingly, in case that the fourth transistor T4 is turned on, the voltage of the carry signal CR may be maintained to the second off voltage VOFF2.

The second capacitor C2 may be connected between the gate electrode of the third transistor T3 and the second output terminal OUT2. The second capacitor C2 may be a boosting capacitor provided in the second output circuit OCR2 to stably output the carry signal CR having the logic high level.

In an embodiment, the waveform of the scan signal SS and the waveform of the carry signal CR may be different from each other. In this case, the stage ST may include the second output circuit OCR2 distinguished from the first output circuit OCR1 and the second clock terminal CK2 distinguished from the first clock terminal CK1. In order to prevent interference between the output of the first output circuit OCR1 (for example, the scan signal SS) and the output of the second output circuit OCR2 (for example, the carry signal CR), the stage ST may include the first power source terminal VIN1 and the second power source terminal VIN2.

However, embodiments are not limited thereto. For example, in another embodiment, the scan signal SS of the next stage (for example, the (i+1)th scan signal SSi+1) may be generated by using the scan signal SS (for example, the i-th scan signal SSi) output from each stage ST. The configuration of the stage ST, waveforms of input/output signals, and operation method may be variously changed according to embodiments.

Figure 7:
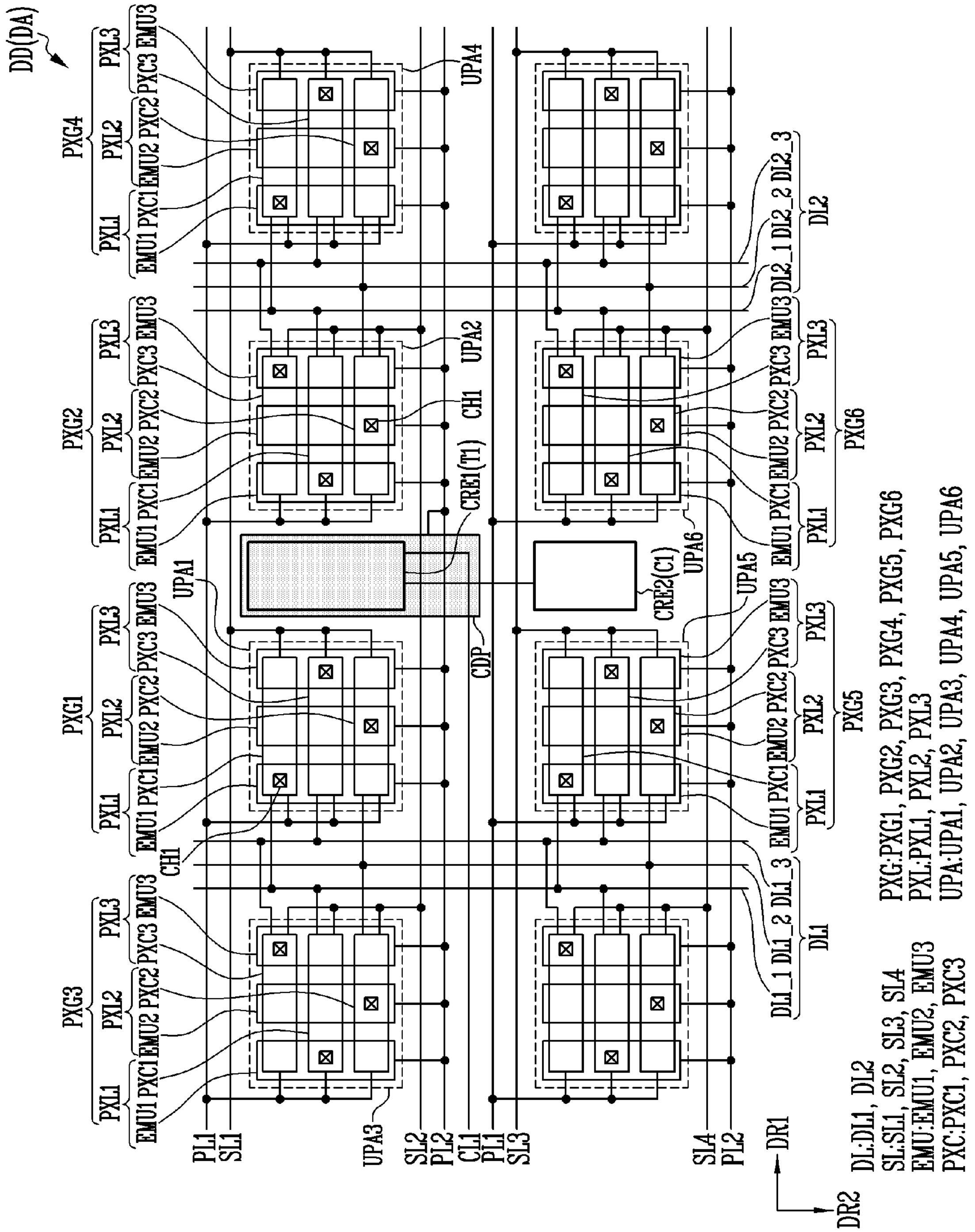
FIG. 7 is a schematic plan view illustrating a display area of a display device according to an embodiment.

FIG. 7 is a schematic plan view illustrating a display area DA of a display device DD according to an embodiment. For example, FIG. 7 shows an area of the display area DA shown in FIGS. 1 and 2, and in particular, shows an area in which first and second circuit elements CRE1 and CRE2 of the driving circuit may be disposed.

Referring to FIGS. 1 to 7, the display area DA may include pixel groups PXG each including pixels PXL and positioned in each unit pixel area UPA. For example, each of the pixels PXL in the display area DA may form a pair with at least one adjacent pixel PXL to form each pixel group PXG.

Also, the display area DA may include at least one circuit element disposed in the display area DA to be positioned between the pixels PXL and/or the pixel groups PXG. The at least one circuit element may be a circuit element constituting the driving circuit. For example, the driving circuit may include circuit elements distributed and disposed in the non-pixel areas (for example, areas positioned in the display area DA and between adjacent pixels PXL and/or pixel groups PXG) between the pixels PXL, as well as the first circuit element CRE1 and the second circuit element CRE2.

The display area DA may further include a conductive pattern CDP overlapping at least the first circuit element CRE1.

First, a structure of the embodiment shown in FIG. 7 will be described with respect to the arrangement of the pixels PXL and the pixel groups PXG including the pixels PXL. In an embodiment, the pixel groups PXG of two adjacent pixel columns may share the data lines DL. In this case, the scan lines SL may be formed in each pixel row, and the scan lines SL may be connected to different pixels PXL. For example, the scan lines SL may include a first scan line SL1 formed in an i-th pixel row of the display area DA and connected to even-numbered pixel groups (or odd-numbered pixel groups) of the i-th pixel row, and a second scan line SL2 formed in the i-th pixel row and connected to the odd-numbered pixel groups (or the even-numbered pixel groups) of the i-th pixel row. Also, the scan lines SL may include a third scan line SL3 formed in an (i+1)th pixel row of the display area DA and connected to the even-numbered pixel groups (or the odd-numbered pixel groups) of the (i+1)th pixel row, and a fourth scan line SL4 formed in the (i+1)th pixel row and connected to the odd-numbered pixel groups (or the even-numbered pixel groups) of the (i+1)th pixel row. The scan lines SL may receive the scan signals SS having the gate-on voltage at different time points.

In an embodiment, the scan lines SL formed in each pixel row may be spaced apart from each other with the pixels PXL of a corresponding pixel row interposed therebetween. For example, the first scan line SL1 and the second scan line SL2 may be disposed in upper and lower areas of the i-th pixel row, respectively, and the third scan line SL3 and the fourth scan line SL4 may be disposed in upper and lower areas of the (i+1)th pixel row, respectively.

In an embodiment, the first power source line PL1 may be formed for each pixel row or for each of multiple rows, and may extend along the first direction DR1 between adjacent pixel rows. The first power source line PL1 (or first sub-power source lines) formed between the pixel rows in the first direction DR1 may be integrally or non-integrally connected in an area between the pixels PXL and/or an outer area of the display area DA to form a first power source line PL1.

Similarly, the second power source line PL2 may be formed for each pixel row or for each of multiple rows, and may extend along the first direction DR1 between adjacent pixel rows. The second power source line PL2 (or second sub-power source lines) formed between the pixel rows in the first direction DR1 may be integrally or non-integrally connected in the area between the pixels PXL and/or the outer area of the display area DA to form one second power source line PL2.

In an embodiment, each pixel group PXG may include a first pixel PXL1, a second pixel PXL2, and a third pixel PXL3 positioned in each unit pixel area UPA. For example, a first pixel group PXG1 positioned in the i-th pixel row may include the first pixel PXL1, the second pixel PXL2, and the third pixel PXL3 positioned in a first unit pixel area UPA1 of the i-th pixel row. Similarly, a second pixel group PXG2 positioned in the i-th pixel row may include the first pixel PXL1, the second pixel PXL2, and the third pixel PXL3 positioned in a second unit pixel area UPA2 of the i-th pixel row.

In an embodiment, the first pixel group PXG1 and the second pixel group PXG2 may be connected to different data lines DL and scan lines SL. For example, the first pixel group PXG1 may be connected to multiple first data lines DL1 and the first scan line SL1, and the second pixel group PXG2 may be connected to multiple second data lines DL2 and the second scan line SL2.

For example, a first pixel circuit PXC1, a second pixel circuit PXC2, and a third pixel circuit PXC3 of the first pixel PXL1, the second pixel PXL2, and the third pixel PXL3 of the first pixel group PXG1 may be connected in common to the first scan line SL1 and the first power source line PL1 to be driven at the same time, and may be connected to a (1_1)th data line DL1_1 (a first sub-data line of a first pixel column), a (1_2)th data line DL1_2 (a second sub-data line of the first pixel column), and a (1_3)th data line DL1_3 (a third sub-data line of the first pixel column), respectively, to receive different data signals. The first pixel circuit PXC1, the second pixel circuit PXC2, and/or the third pixel circuit PXC3 may be further selectively connected to at least one signal line and/or power source line.

Pixel circuits PXC of the first pixel PXL1, the second pixel PXL2, and the third pixel PXL3 of the first pixel group PXG1 may be electrically connected to emission units EMU through first contact holes CH1, respectively. For example, the first pixel circuit PXC1 of the first pixel group PXG1 may be connected to a first emission unit EMU1 of the first pixel group PXG1 to configure the first pixel PXL1 of the first pixel group PXG1 together with the first emission unit EMU1. Similarly, the second pixel circuit PXC2 of the first pixel group PXG1 may be connected to a second emission unit EMU2 of the first pixel group PXG1 to configure the second pixel PXL2 of the first pixel group PXG1 together with the second emission unit EMU2, and the third pixel circuit PXC3 of the first pixel group PXG1 may be connected to a third emission unit EMU3 of the first pixel group PXG1 to configure the third pixel PXL3 of the first pixel group PXG1 together with the third emission unit EMU3. The emission units EMU of the first pixel group PXG1 may be individually connected to each pixel circuit PXC, and may be commonly connected to the second power source line PL2.

The first pixel circuit PXC1, the second pixel circuit PXC2, and the third pixel circuit PXC3 of the first pixel PXL1, the second pixel PXL2, and the third pixel PXL3 of the second pixel group PXG2 may be connected in common to the second scan line SL2 and the first power source line PL1 to be driven at the same time, and may be connected to a (2_1)th data line DL2_1 (the first sub-data line of a second pixel column), a (2_2)th data line DL2_2 (the second sub-data line of the second pixel column), and a (2_3)th data line DL2_3 (the third sub-data line of the second pixel column), respectively, to receive different data signals. The first pixel circuit PXC1, the second pixel circuit PXC2, and/or the third pixel circuit PXC3 may be further selectively connected to at least one signal line and/or power source line.

The pixel circuits PXC of the first pixel PXL1, the second pixel PXL2, and the third pixel PXL3 of the second pixel group PXG2 may be electrically connected to the emission units EMU through the first contact holes CH1, respectively. For example, the first pixel circuit PXC1 of the second pixel group PXG2 may be connected to the first emission unit EMU1 of the second pixel group PXG2 to configure the first pixel PXL1 of the second pixel group PXG2 together with the first emission unit EMU1. Similarly, the second pixel circuit PXC2 of the second pixel group PXG2 may be connected to the second emission unit EMU2 of the second pixel group PXG2 to configure the second pixel PXL2 of the second pixel group PXG2 together with the second emission unit EMU2, and the third pixel circuit PXC3 of the second pixel group PXG2 may be connected to the third emission unit EMU3 of the second pixel group PXG2 to configure the third pixel PXL3 of the second pixel group PXG2 together with the third emission unit EMU3. The emission units EMU of the second pixel group PXG2 may be individually connected to each pixel circuit PXC, and may be commonly connected to the second power source line PL2.

In an embodiment, in each unit pixel area UPA, the pixel circuits PXC and the emission units EMU may be arranged along different directions and may overlap each other. For example, in each unit pixel area UPA, the pixel circuits PXC may be arranged along the second direction DR2, and the emission units EMU may be arranged along the first direction DR1. Each emission unit EMU may overlap a plurality of pixel circuits PXC including the pixel circuit PXC of a corresponding pixel PXL, and may be electrically connected to the pixel circuit PXC in an area overlapping the pixel circuit PXC of the corresponding pixel PXL. For example, the first emission unit EMU1 of the first pixel group PXG1 may overlap the first, second, and third pixel circuits PXC1, PXC2, and PXC3 of the first pixel group PXG1, and may be connected to the first pixel circuit PXC1 through the first contact hole CH1 in an area overlapping the first pixel circuit PXC1 of the first pixel group PXG1.

For example, the pixel circuits PXC and the emission units EMU may be formed on different layers and may overlap each other. Accordingly, the positions and arrangement order of the pixel circuits PXC and the emission units EMU in each unit pixel area UPA and/or the display area DA can be designed more freely.

Further, adjacent pixel groups PXG, for example, the first and second pixel groups PXG1 and PXG2, may have the same or different arrangement structure. For example, in the first and second unit pixel areas UPA1 and UPA2, the first, second, and third pixel circuits PXC1, PXC2, and PXC3 may be arranged in different orders, and the first, second, and third emission units EMU1, EMU2, and EMU3 may be arranged in the same order. The arrangement structure of the pixels PXL and/or the pixel groups PXG may be variously changed according to embodiments.

In an embodiment, the first pixel group PXG1 and the second pixel group PXG2 may share the data lines DL with a third pixel group PXG3 and a fourth pixel group PXG4, respectively. For example, the third pixel group PXG3 may be disposed on the left side of the first pixel group PXG1, and may share the first data lines DL1 positioned between the first and third unit pixel areas UPA1 and UPA3 with the first pixel group PXG1. For example, the first pixel circuit PXC1, the second pixel circuit PXC2, and the third pixel circuit PXC3 of the third pixel group PXG3 may be connected to the first data lines DL1 and the second scan line SL2.

The second pixel group PXG2 may be disposed on the right side of the first pixel group PXG1. The first pixel group PXG1 and the second pixel group PXG2 may not share the data lines DL.

The fourth pixel group PXG4 may be disposed on the right side of the second pixel group PXG2, and may share the second data lines DL2 positioned between the second and fourth unit pixel areas UPA2 and UPA4 with the second pixel group PXG2. For example, the first pixel circuit PXC1, the second pixel circuit PXC2, and the third pixel circuit PXC3 of the fourth pixel group PXG4 may be connected to the second data lines DL2 and the first scan line SL1. Each of the third pixel group PXG3 and the fourth pixel group PXG4 may have a structure substantially similar to the first and/or second pixel groups PXG1 and PXG2.

The arrangement structure of the pixels PXL is not limited to the embodiment of FIG. 7. For example, in another embodiment, the data lines DL may be arranged for each pixel column. In this case, adjacent pixel columns may not share the data lines DL and may be connected to different data lines DL. Also, the pixels PXL arranged in the same pixel row may be connected to the same scan line SL to simultaneously receive the data signals.

The first pixel PXL1, the second pixel PXL2, and the third pixel PXL3 formed in each unit pixel area UPA may be sub-pixels that emit light of different colors. For example, the first pixel PXL1, the second pixel PXL2, and the third pixel PXL3 may be a red sub-pixel, a green sub-pixel, and a blue sub-pixel, respectively. However, the type, number, and/or mutual arrangement structure of the pixels PXL constituting each pixel group PXG may be variously changed according to embodiments.

The driving circuit may include at least one circuit element disposed in the display area DA to be positioned between the pixels PXL and/or the pixel groups PXG. For example, the driving circuit may include the circuit elements distributed and disposed in the non-pixel areas (for example, areas positioned in the display area DA and between adjacent pixels PXL and/or pixel groups PXG) between the pixels PXL, as well as the first circuit element CRE1 and the second circuit element CRE2.

In an embodiment, the first circuit element CRE1 and the second circuit element CRE2 may be circuit elements constituting the gate driver GDR. For example, the first circuit element CRE1 may be the first transistor T1 of the i-th stage STi, and the second circuit element CRE2 may be the first capacitor C1 of the i-th stage STi (or another stage). The remaining circuit elements of the i-th stage STi and circuit elements constituting the remaining stages of the gate driver GDR may also be distributed and disposed in the non-pixel areas in the display area DA.

In case that the first circuit element CRE1 is the first transistor T1 of the gate driver GDR, the display area DA may include a first clock line CL1 connected to the first transistor T1 to transfer the first clock signal CLK1. The display area DA may further include signal lines and/or power source lines for transferring driving signals and/or power sources to the circuit elements formed therein.

For example, the first circuit element CRE1 may be a transistor connected to the first clock line CL1 and outputting an i-th gate signal to an i-th gate line by using the first clock signal CLK1 input through the first clock line CL1. For example, the first circuit element CRE1 may be the first transistor T1 of the i-th stage STi that outputs the i-th scan signal SSi to the i-th scan line SLi using the first clock signal CLK1. In this case, the first circuit element CRE1 may be further connected to the Q node of the i-th stage STi and the first output terminal OUT1 (or the i-th scan line SLi).

In an embodiment, the first circuit element CRE1 may be disposed in the i-th pixel row. For example, the first circuit element CRE1 may be disposed between the first pixel group PXG1 and the second pixel group PXG2 disposed to be adjacent to each other in the i-th pixel row. The first circuit element CRE1 may be disposed so as not to overlap the pixels PXL. For example, the first circuit element CRE1 may be disposed between the first unit pixel area UPA1 in which the first pixel group PXG1 may be positioned and the second unit pixel area UPA2 in which the second pixel group PXG2 may be positioned. The first circuit element CRE1 may be formed together with the circuit elements of the pixel circuits PXC in a process of forming the pixel circuits PXC.

In an embodiment, the first clock line CL1 may pass through the non-pixel area between two adjacent pixel rows and may extend in the first direction DR1 in the display area DA. For example, the first clock line CL1 may extend in the first direction DR1 in the display area DA to pass through an area between the i-th pixel row and the (i+1)th pixel row, and an end of the first clock line CL1 may be connected to the first circuit element CRE1.

In an embodiment, the first clock line CL1 may be positioned between two power source lines formed between the pixels PXL in two adjacent pixel rows. For example, the first circuit element CRE1 may be positioned in the non-pixel area between the first and second unit pixel areas UPA1 and UPA2 arranged parallel to the i-th pixel row, and the first clock line CL1 may be disposed between the second power source line PL2 connected to the pixels PXL in the i-th pixel row and the first power source line PL1 connected to the pixels PXL in the (i+1)th pixel row. The second power source line PL2 connected to the pixels PXL in the i-th pixel row and the first power source line PL1 connected to the pixels PXL in the (i+1)th pixel row may be formed between the pixels PXL in the i-th pixel row and the pixels PXL in the (i+1)th pixel row. In case that the first clock line CL1 is disposed between two adjacent power source lines, a problem in which the first clock signal CLK1 affects the operation of the surrounding pixels PXL due to a coupling action or the like may be reduced or minimized. Accordingly, operation characteristics of the pixels PXL may be uniform and/or stabilized.

The second circuit element CRE2 may be disposed in the same or different pixel row as the first circuit element CRE1. In case that the second circuit element CRE2 is an element directly connected to the first circuit element CRE1, the second circuit element CRE2 may be disposed around the first circuit element CRE1. For example, in case that the first circuit element CRE1 is disposed between the first and second pixel groups PXG1 and PXG2 of the i-th pixel row, the second circuit element CRE2 may be disposed between fifth and sixth pixel groups PXG5 and PXG6 of the (i+1)th pixel row. As an example, the second circuit element CRE2 may be disposed in the non-pixel area between a fifth unit pixel area UPA5 in which the fifth pixel group PXG5 may be positioned and a sixth unit pixel area UPA6 in which the sixth pixel group PXG6 may be positioned.

The fifth and sixth pixel groups PXG5 and PXG6 may be disposed around the first and second pixel groups PXG1 and PXG2. For example, the first and fifth pixel groups PXG1 and PXG5 may be sequentially arranged in a j-th pixel column, and the second and sixth pixel groups PXG2 and PXG6 may be sequentially arranged in a (j+1)th pixel column, where j may be a natural number.

FIG. 7 shows an embodiment in which each of the first circuit element CRE1 and the second circuit element CRE2 may be disposed in the non-pixel areas between adjacent unit pixel areas UPA, but embodiments are not limited thereto. For example, in another embodiment, the first circuit element CRE1 and/or the second circuit element CRE2 may be disposed in the non-pixel area between a plurality of pixels PXL positioned in any one unit pixel area UPA.

In an embodiment, the first circuit element CRE1 and the second circuit element CRE2 may be formed together with the circuit elements of the pixel circuits PXC. For example, in a process of forming transistors (for example, the first, second, and third transistors M1, M2, M3 shown in FIG. 3) and capacitors (for example, the capacitor Cst shown in FIG. 3) of the pixel circuits PXC, the circuit elements of the stages ST including first transistors T1 and first capacitors C1 of the stages ST may be simultaneously formed. Accordingly, manufacturing cost of the display device DD may be reduced and manufacturing efficiency may be improved.

The conductive pattern CDP may be disposed in the display area DA to overlap the first circuit element CRE1. In an embodiment, in case that a plurality of first circuit elements CRE1, for example, a plurality of first transistors T1 included in a plurality of stages ST, are distributed and disposed in the display area DA, the display area DA may include a plurality of conductive patterns CDP overlapping each of the first transistors T1 and each having a separate pattern. In addition to the first circuit element CRE1, the display area DA may further include at least one circuit element constituting the driving circuit, a signal line, and/or another conductive pattern (not shown) overlapping the power source line.

The conductive pattern CDP may also overlap a portion of the first clock line CL1 connected to the first circuit element CRE1. For example, the conductive pattern CDP may overlap the first clock line CL1 around the first circuit element CRE1.

In an embodiment, in case that at least one signal line and/or power source line is disposed around the first circuit element CRE1 and the first clock line CL1, for example, between the first circuit element CRE1 and the first clock line CL1, the conductive pattern CDP may also overlap a portion of the at least one signal line and/or power source line. For example, the conductive pattern CDP may also overlap a portion of the second scan line SL2 and the second power source line PL2.

The conductive pattern CDP may be connected to a power source line to which a power source may be supplied. For example, the conductive pattern CDP may be connected to an adjacent second power source line PL2 to receive the second power source VSS having a constant potential. In this case, the first circuit element CRE1 and a portion of the first clock line CL1 connected thereto may be capped by the conductive pattern CDP connected to the second power source VSS. Therefore, the size of parasitic capacitance formed between the first circuit element CRE1 and the first clock line CL1 and the pixels PXL around them and/or deviation in the parasitic capacitance may be reduced or prevented. Accordingly, the deviation in characteristics of the pixels PXL may be reduced or prevented, and image quality of the display device DD may be improved.

In an embodiment, the conductive pattern CDP may be formed so as not to overlap the pixels PXL. For example, the conductive pattern CDP may be formed as a separate pattern (for example, an island pattern) on a portion of the first clock line CL1, and the first circuit element CRE1, and may not overlap adjacent pixels PXL.

The conductive pattern CDP may be formed together with electrodes of the emission units EMU. For example, the conductive pattern CDP may be formed on the same layer as the first electrodes ELT1 and the second electrodes ELT2 in a process of forming the first electrodes ELT1 and the second electrodes ELT2 of the emission units EMU, and may be formed to cover at least the first circuit element CRE1. Accordingly, in a process of forming the emission units EMU of the pixels PXL, the conductive pattern CDP can be easily formed.

Figure 8:
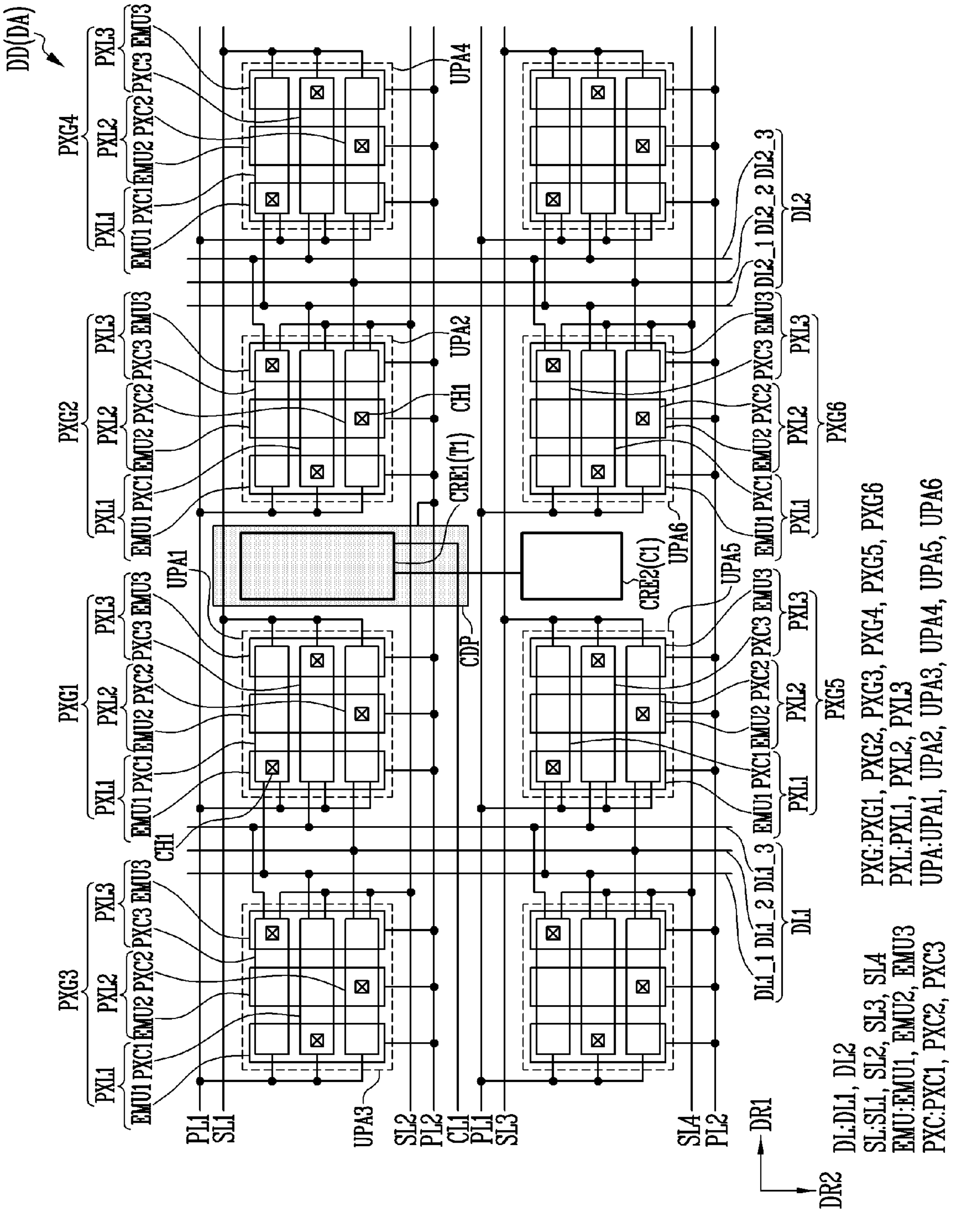
FIGS. 8 to 10 are schematic plan views each illustrating a display area of a display device according to an embodiment.
Figure 9:
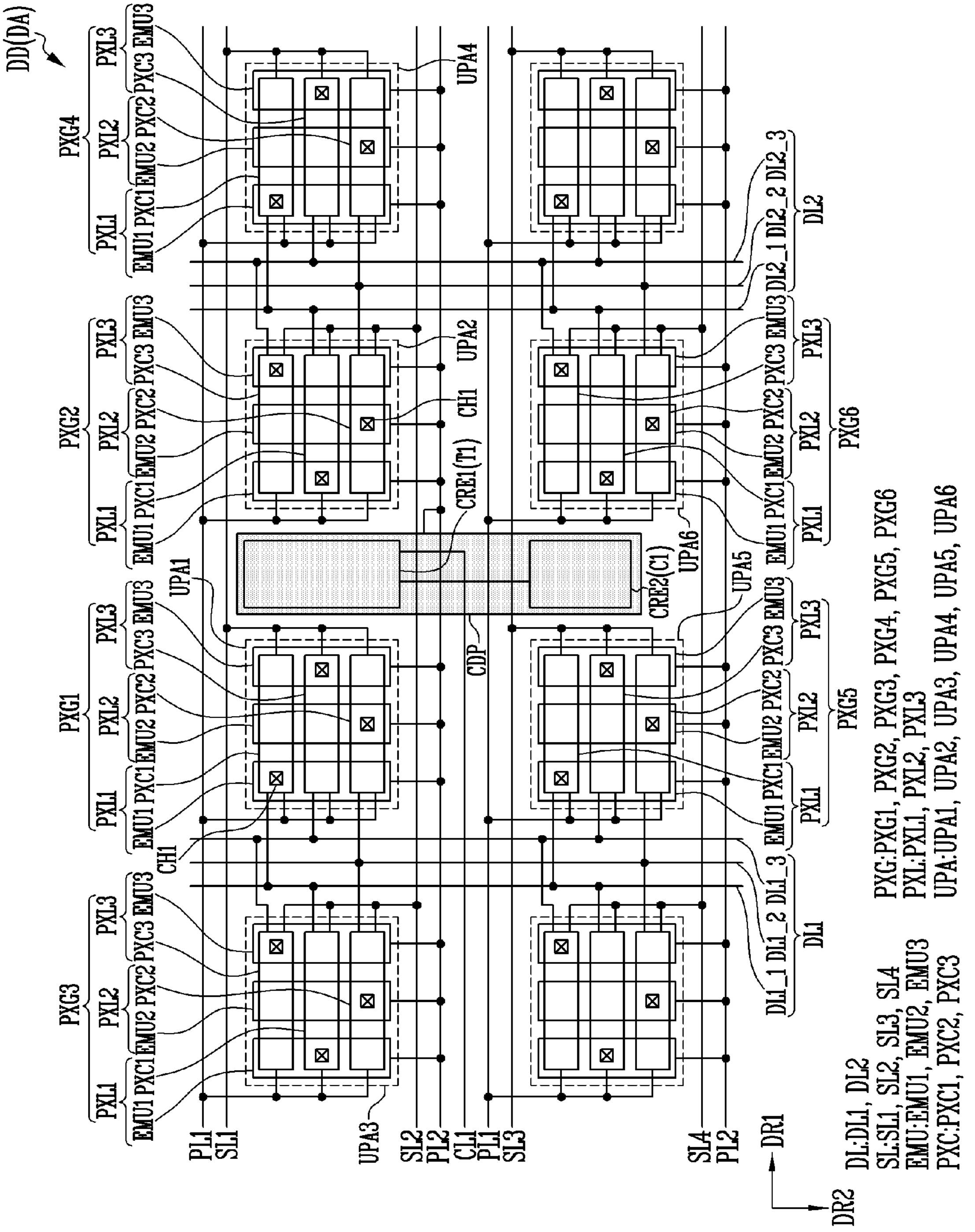
Figure 10:
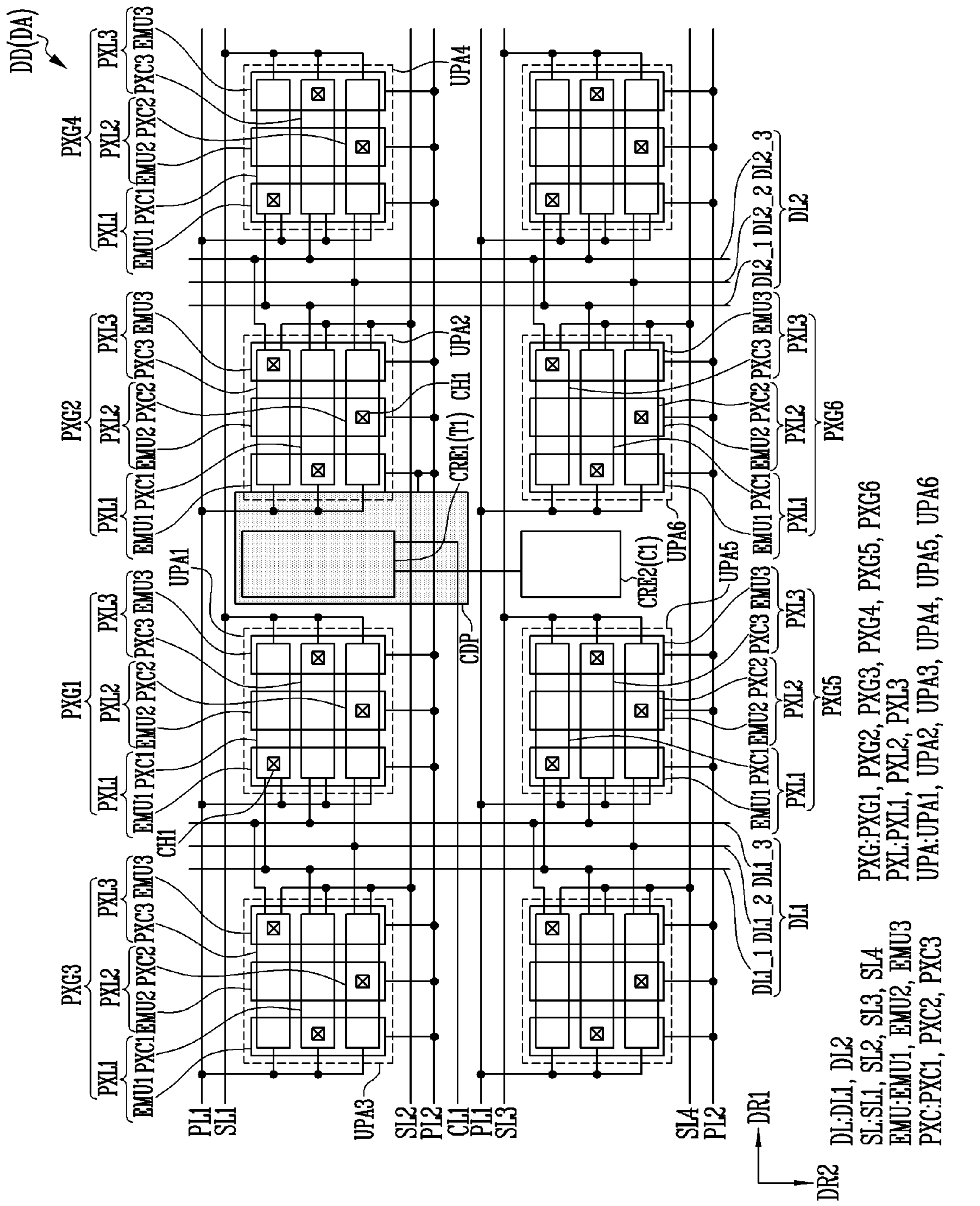

FIGS. 8 to 10 are schematic plan views each illustrating a display area DA of a display device DD according to an embodiment. For example, FIGS. 8 to 10 show modified embodiments different from the embodiment of FIG. 7. In describing the embodiments of FIGS. 8 to 10, descriptions of configurations that may be substantially similar or identical to those of the embodiment of FIG. 7 will be omitted.

Referring to FIGS. 1 to 8, at least one gate line GL may be disposed around the first circuit element CRE1 and/or the first clock line CL1, and the conductive pattern CDP may overlap the at least one gate line GL. For example, the first scan line SL1 and the second scan line SL2 may be disposed around the first circuit element CRE1, and the conductive pattern CDP may overlap a portion of each of the first scan line SL1 and the second scan line SL2 around the first circuit element CRE1. Accordingly, variations in voltages of the gate signals (for example, the scan signals SS) due to variation in voltage of the first clock signal CLK1 input to the first clock line CL1 may be prevented, and the pixels PXL may be stably driven.

Referring to FIGS. 1 to 9, the conductive pattern CDP may overlap the first circuit element CRE1 and the second circuit element CRE2 positioned around the first circuit element CRE1. For example, the conductive pattern CDP may have a wider area by extending from an area where the first circuit element CRE1 may be formed to an area where the second circuit element CRE2 may be formed. Accordingly, a problem in which the second circuit element CRE2 affects the operation of the surrounding pixels PXL may be reduced or minimized.

Referring to FIGS. 1 to 10, the conductive pattern CDP may extend toward at least one adjacent pixel PXL, and may be integrally connected to one electrode of the at least one adjacent pixel PXL. For example, in case that the conductive pattern CDP is electrically connected to the second power source line PL2, the conductive pattern CDP may extend to an area in which the emission unit EMU of the at least one adjacent pixel PXL may be formed, and may be formed integrally with the second electrode ELT2 of the emission unit EMU. For example, the conductive pattern CDP may extend to an area in which the first emission unit EMU1 of the second pixel group PXG2 may be formed, and may be formed integrally with the second electrode ELT2 of the first emission unit EMU1. In this case, the conductive pattern CDP may be connected to the second power source line PL2 through the second contact hole CH2 (shown in FIG. 4) formed in the first pixel PXL1 of the second pixel group PXG2 without forming a contact hole for connecting the conductive pattern CDP to the second power source line PL2.

Figure 11:
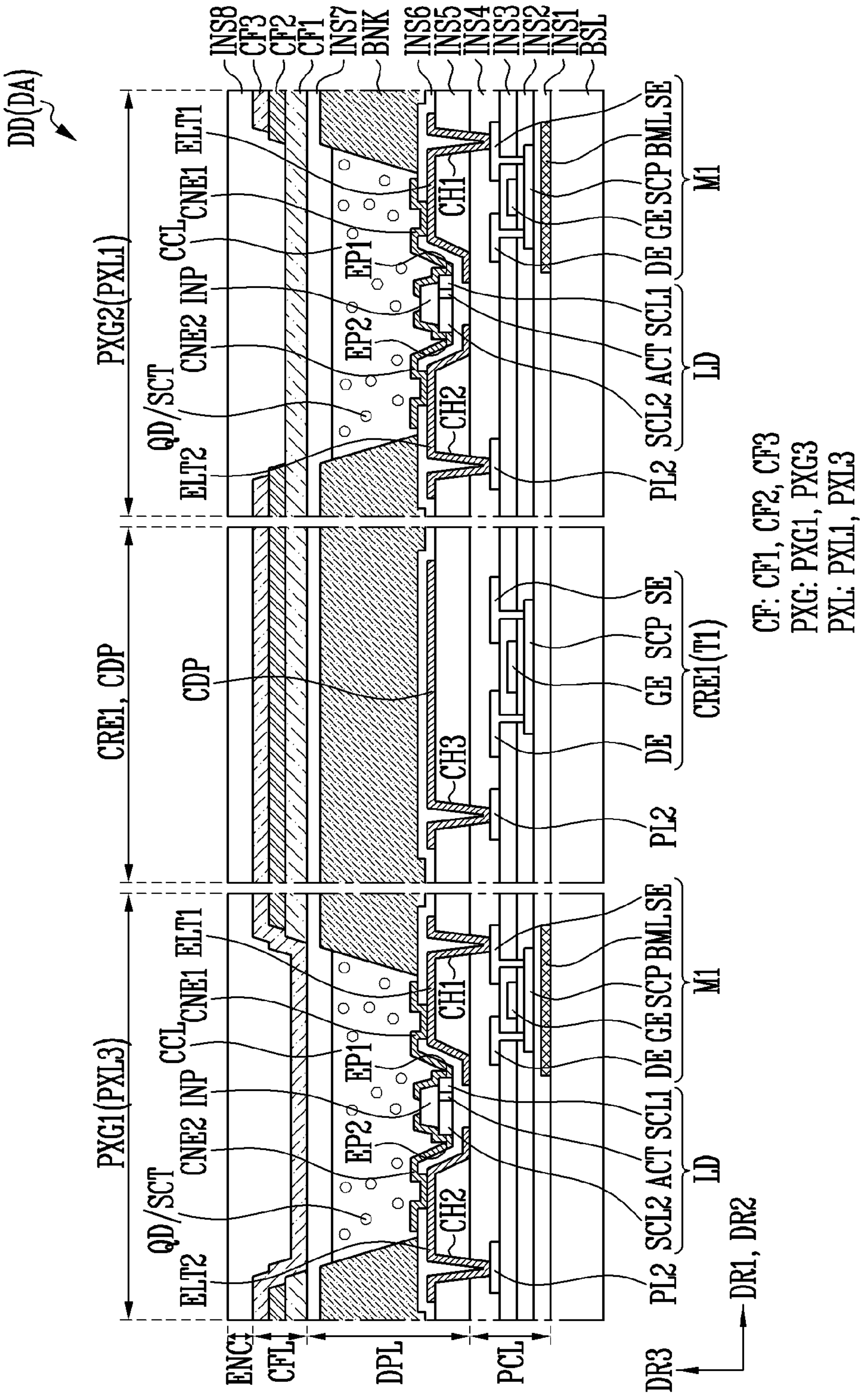
FIGS. 11 and 12 are schematic cross-sectional views each illustrating a display area of a display device according to an embodiment.
Figure 12:
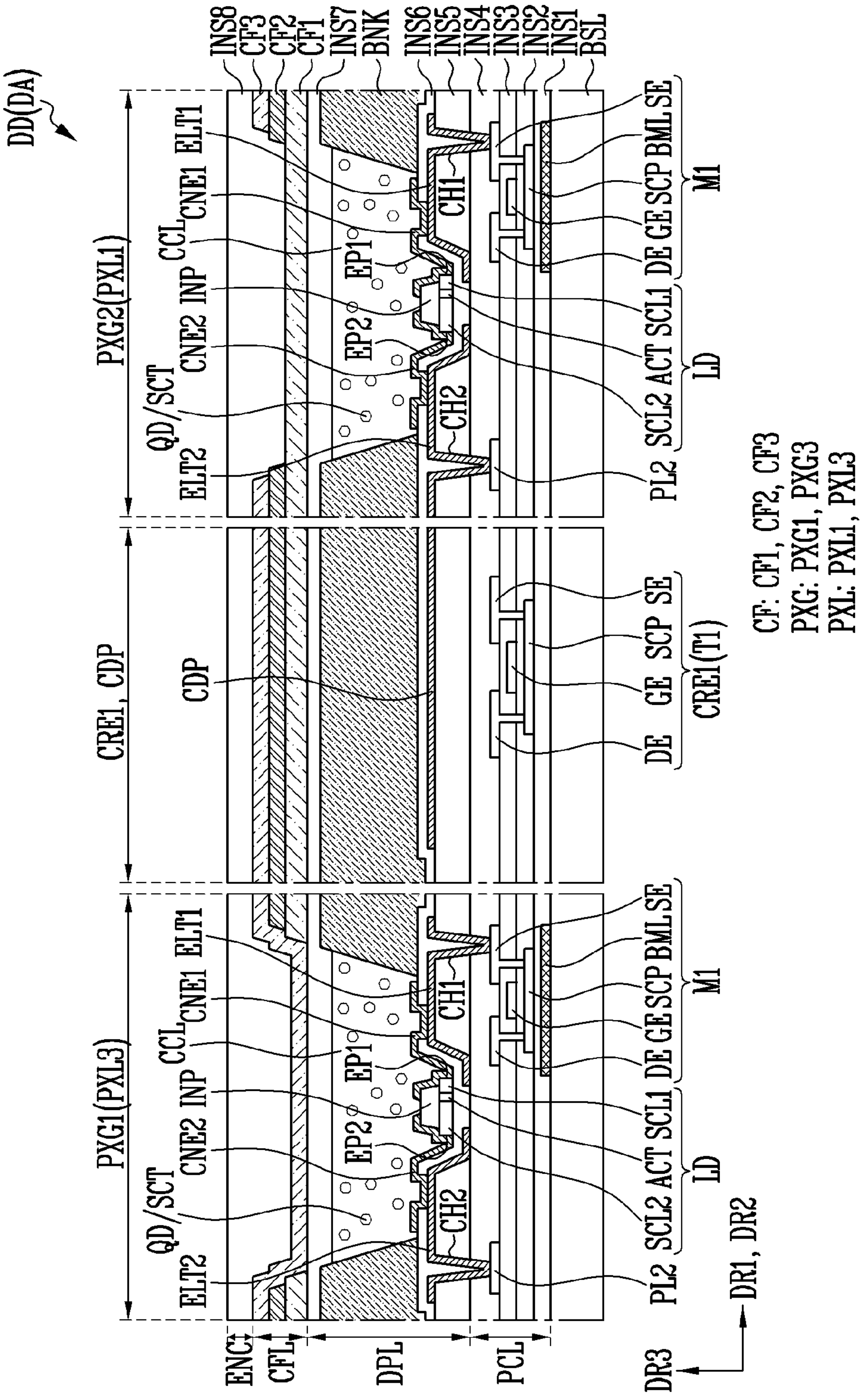

FIGS. 11 and 12 are schematic cross-sectional views each illustrating a display area DA of a display device DD according to an embodiment. For example, FIGS. 11 and 12 show different embodiments in relation to the conductive pattern CDP.

FIGS. 11 and 12 schematically show cross-sections of the display area DA based on the first circuit element CRE1 and the conductive pattern CDP, and the third pixel PXL3 of the first pixel group PXG1 and the first pixel PXL1 of the second pixel group PXG2 positioned on both sides of the first circuit element CRE1. In FIGS. 11 and 12, the first transistor M1 provided in each pixel PXL as an example of the circuit elements that may be disposed in unit pixel areas UPA of a circuit layer PCL, the first transistor T1 of each stage ST as an example of the first circuit element CRE1, and the second power source line PL2 as an example of wiring that may be disposed on the circuit layer PCL will be disclosed. The pixels PXL of the display area DA may have a substantially similar cross-sectional structure, but the size and/or shape of the circuit elements constituting each pixel PXL and the electrodes included in the circuit elements may be variously changed according to embodiments.

Referring to FIGS. 1 to 12, the display device DD may include a base layer BSL, a circuit layer PCL, and a display layer DPL. The circuit layer PCL and the display layer DPL may be disposed to overlap each other on the base layer BSL. For example, the circuit layer PCL and the display layer DPL may be sequentially disposed on a surface of the base layer BSL.

Also, the display device DD may further include a color filter layer CFL disposed on the display layer DPL. In an embodiment, the color filter layer CFL may be directly formed on a surface of the base layer BSL on which the circuit layer PCL and the display layer DPL may be formed, but embodiments are not limited thereto. The display device DD may further include an encapsulation layer ENC that seals a surface of the base layer BSL on which the circuit layer PCL, the display layer DPL, and/or the color filter layer CFL may be formed.

The pixel circuits PXC constituting the pixels PXL of each pixel group PXG may be formed in each unit pixel area UPA of the circuit layer PCL. For example, the circuit elements including the first transistor M1 may be formed in each pixel circuit PXC area. In an embodiment, the circuit layer PCL may selectively further include a lower metal layer BML of the first transistor M1 and the like.

The circuit elements of the driving circuit may be formed in the non-pixel area between the unit pixel areas UPA of the circuit layer PCL. For example, the first circuit element CRE1 may be formed between the first unit pixel area UPA1 and the second unit pixel area UPA2. In an embodiment, the first circuit element CRE1 may be the first transistor T1 of the i-th stage STi. The first transistor T1 of the i-th stage STi may be formed on the base layer BSL together with first transistors M1 of the pixel circuits PXC.

Wirings (signal lines and power source lines) connected to the pixels PXL and the circuit elements of the driving circuit may be formed in the circuit layer PCL. For example, the scan lines SL, the data lines DL, the first power source line PL1, the second power source line PL2, the first clock line CL1, and the like may be formed in the circuit layer PCL.

The circuit layer PCL may include insulating layers. For example, the circuit layer PCL may include a first insulating layer INS1, a second insulating layer INS2, a third insulating layer INS3, and/or a fourth insulating layer INS4 sequentially disposed on a surface of the base layer BSL.

The circuit layer PCL may be disposed on the base layer BSL and may selectively include a first conductive layer including the lower metal layer BML of the first transistor M1 and the like. The first conductive layer may be disposed between the base layer BSL and the first insulating layer INS1, and may include lower metal layers BML overlapping a gate electrode GE and/or semiconductor pattern SCP of each of the first transistors M1 of the pixels PXL. In an embodiment, the lower metal layers BML may be connected to one electrode (for example, a source or drain electrode) of the first transistors M1.

The first insulating layer INS1 may be disposed on a surface of the base layer BSL including the first conductive layer. The first insulating layer INS1 may prevent diffusion of impurities into each circuit element.

A semiconductor layer may be disposed on the first insulating layer INS1. The semiconductor layer may include a semiconductor pattern SCP of each transistor and the like. For example, the semiconductor layer may include semiconductor patterns SCP of the first transistors M1 of the pixels PXL and the first transistors T1 of the stages ST. Each semiconductor pattern SCP may include a channel region overlapping a gate electrode GE of a corresponding transistor, and first and second conductive regions (for example, a source region and a drain region) disposed on sides of the channel region.

The semiconductor patterns SCP may be semiconductor patterns made of polysilicon, amorphous silicon, oxide semiconductor, or a combination thereof. The first and second conductive regions of the semiconductor pattern SCP may be doped with dopants of different conductivity types.

In an embodiment, the first transistors M1 of the pixels PXL and the first transistors T1 of the stages ST may include the semiconductor patterns SCP formed of the oxide semiconductor. The oxide semiconductor may include metal oxides such as zinc (Zn), indium (In), gallium (Ga), tin (Sn), and titanium (Ti), or a combination of metals such as zinc (Zn), indium (In), gallium (Ga), tin (Sn), and titanium (Ti) and oxides thereof. For example, the oxide semiconductor may include at least on of zinc oxide (ZnO), zinc-tin oxide (ZTO), zinc-indium oxide (ZIO), indium oxide (InO), titanium oxide (TiO), indium-gallium-zinc oxide (IGZO), and indium-zinc-tin oxide (IZTO). In case that the semiconductor patterns SCP of the first transistors M1 of the pixels PXL and the first transistors T1 of the stages ST are formed of the oxide semiconductor, mobility of the first transistors M1 of the pixels PXL and the first transistors T1 of the stages ST may be improved.

The second insulating layer INS2 may be disposed on the semiconductor layer. A second conductive layer may be disposed on the second insulating layer INS2.

The second conductive layer may include the gate electrode GE of each transistor and the like. The second conductive layer may further include an electrode of each of the capacitors provided in the pixel circuits PXC and stages ST (for example, the capacitor Cst of FIG. 3 and the first and second capacitors C1 and C2 of FIG. 6), wirings, and/or bridge patterns.

The third insulating layer INS3 may be disposed on the second conductive layer. A third conductive layer may be disposed on the third insulating layer INS3.

The third conductive layer may include source and drain electrodes SE and DE of each transistor. The third conductive layer may further include an electrode of each of the capacitors provided in the pixel circuits PXC and the stages ST (for example, the capacitor Cst of FIG. 3 and the first and second capacitors C1 and C2 of FIG. 6), wirings, and/or bridge patterns. As an example, the third conductive layer may include signal lines such as the scan lines SL or the data lines DL, the first power source line PL1 and/or the second power source line PL2.

Each conductive pattern, electrode, and/or wiring constituting the first to third conductive layers may have conductivity by including at least one conductive material, and materials constituting them are not particularly limited. For example, each conductive pattern, electrode, and/or wiring constituting the first to third conductive layers may include at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu), and may include various kinds of conductive materials in addition to the above materials.

The fourth insulating layer INS4 may be disposed on the third conductive layer. In an embodiment, the fourth insulating layer INS4 may be a first planarization layer for planarizing the surface of the circuit layer PCL. For example, the fourth insulating layer INS4 may include at least an organic insulating layer, and may substantially planarize the surface of the circuit layer PCL.

The display layer DPL may be disposed on the fourth insulating layer INS4.

Each of the first insulating layer INS1, the second insulating layer INS2, the third insulating layer INS3, and the fourth insulating layer INS4 may be composed of a single layer or multiple layers, and may include at least one inorganic insulating material and/or organic insulating material. For example, each of the first insulating layer INS1, the second insulating layer INS2, the third insulating layer INS3, and the fourth insulating layer INS4 may include various kinds of organic/inorganic insulating materials including silicon nitride (SiNx), silicon oxide (SiOx), silicon oxynitride (SiOxNy), or a combination thereof.

The display layer DPL may include the emission unit EMU of each pixel PXL. For example, the display layer DPL may include the first and second electrodes ELT1 and ELT2, the light emitting elements LD, and the first and second contact electrodes CNE1 and CNE2 disposed in the emission area of each pixel PXL.

Also, the display layer DPL may further include a fifth insulating layer INS5, a sixth insulating layer INS6, a bank BNK, an insulating pattern INP, a light conversion layer CCL, and/or a seventh insulating layer INS7 which may be sequentially disposed on one surface of the base layer BSL on which the circuit layer PCL may be formed.

The fifth insulating layer INS5 may be provided and/or formed on the fourth insulating layer INS4. In an embodiment, the fifth insulating layer INS5 may have an opening or a recess corresponding to the emission area of each pixel PXL. For example, the fifth insulating layer INS5 may have the opening or the recess corresponding to the emission area so as to surround the light emitting elements LD provided in the emission area of each pixel PXL. In another embodiment, the fifth insulating layer INS5 may be formed of separate patterns separately disposed under each of the first electrode ELT1 and the second electrode ELT2.

The first and second electrodes ELT1 and ELT2 may protrude upward (for example, in a third direction DR3) from the periphery of the light emitting elements LD by the fifth insulating layer INS5. The fifth insulating layer INS5 and the first and second electrodes ELT1 and ELT2 thereon may form a reflective protruding pattern around the light emitting elements LD. Accordingly, as the light emitted from the light emitting elements LD may be further directed toward the upper portion of the pixel PXL, light efficiency of the pixels PXL may be improved.

The fifth insulating layer INS5 may include an inorganic insulating layer made of an inorganic material or an organic insulating layer made of an organic material, or a combination thereof. The fifth insulating layer INS5 may be formed of a single layer or multiple layers, and cross-sectional structure thereof is not particularly limited.

The first and second electrodes ELT1 and ELT2 of the emission units EMU and the conductive pattern CDP may be formed on the fifth insulating layer INS5. For example, in each unit pixel area UPA, the first and second electrodes ELT1 and ELT2 constituting the emission units EMU of corresponding pixels PXL may be formed on the fifth insulating layer INS5. In an area in which the first circuit element CRE1 and the like may be formed, the conductive pattern CDP may be formed on the fifth insulating layer INS5.

In an embodiment, the conductive pattern CDP may be formed simultaneously with the first and second electrodes ELT1 and ELT2 of the pixels PXL. In this case, the conductive pattern CDP may be disposed on the same layer as the first and second electrodes ELT1 and ELT2 of the pixels PXL, and may include the same conductive material as the first and second electrodes ELT1 and ELT2.

The conductive pattern CDP may have a larger area than the first circuit element CRE1 so as to cover at least the first circuit element CRE1. For example, the conductive pattern CDP may cover the upper portion of the first circuit element CRE1, and may further cover the upper portion of the first clock line CL1 and/or at least one scan line SL around the first circuit element CRE1.

In an embodiment, the conductive pattern CDP may have individually separated patterns as shown in FIG. 11. In this case, the conductive pattern CDP may be connected to the second power source line PL2 through a third contact hole CH3.

In another embodiment, as shown in FIG. 12, the conductive pattern CDP may be connected to the second electrode ELT2 provided in an adjacent pixel PXL, for example, the second pixel PXL2 of the second pixel group PXG2, and may be integrally formed with the second electrode ELT2. In this case, the conductive pattern CDP may share the second contact hole CH2 with the second electrode ELT2, and may be connected to the second power source line PL2 through the second contact hole CH2.

The first and second electrodes ELT1 and ELT2 may be disposed on the fifth insulating layer INS5 to have a surface profile corresponding to the shape of the fifth insulating layer INS5. Each first electrode ELT1 may be connected to the first transistor M1 of a corresponding pixel PXL through the first contact hole CH1, and each second electrode ELT2 may be connected to the second power source line PL2 through the second contact hole CH2.

The first and second electrodes ELT1 and ELT2 may include at least one conductive material. For example, the first and second electrodes ELT1 and ELT2 may include at least one metal of various metal materials such as silver (Ag), magnesium (Mg), aluminum (Al), platinum (Pt), palladium (Pd), gold (Au), nickel (Ni), Neodymium (Nd), iridium (Ir), chromium (Cr), titanium (Ti), molybdenum (Mo), and copper (Cu), or alloys thereof. The first and second electrodes ELT1 and ELT2 may include at least one conductive material of a conductive oxide such as indium tin oxide (ITO), indium zinc oxide (IZO), indium tin zinc oxide (ITZO), zinc oxide (ZnO), aluminum doped zinc oxide (AZO), gallium doped zinc oxide (GZO), zinc tin oxide (ZTO), gallium tin oxide (GTO), and fluorine doped tin oxide (FTO), and a conductive polymer such as PEDOT. However, embodiments are not limited thereto. For example, the first and second electrodes ELT1 and ELT2 may include other conductive materials such as carbon nanotubes or graphene. For example, the first and second electrodes ELT1 and ELT2 may have conductivity by including at least one of various conductive materials. The first and second electrodes ELT1 and ELT2 may include conductive materials that may be the same as or different from each other.

Each of the first and second electrodes ELT1 and ELT2 may be composed of a single layer or multiple layers. For example, the first and second electrodes ELT1 and ELT2 may include a reflective electrode layer including a reflective conductive material (for example, metal). The first and second electrodes ELT1 and ELT2 may selectively further include at least one of a transparent electrode layer disposed above and/or below the reflective electrode layer, and a conductive capping layer covering the upper portion of the reflective electrode layer and/or the transparent electrode layer.

The sixth insulating layer INS6 may be disposed on the first and second electrodes ELT1 and ELT2 and the conductive pattern CDP. In an embodiment, the sixth insulating layer INS6 may be formed on an entire upper surface of the display area DA in which the first and second electrodes ELT1 and ELT2 and the conductive pattern CDP may be formed, and may include openings exposing portions of the first and second electrodes ELT1 and ELT2, respectively. In another embodiment, the sixth insulating layer INS6 may include a plurality of contact holes for connecting the first and second electrodes ELT1 and ELT2 to the first and second contact electrodes CNE1 and CNE2, respectively. In an area where the sixth insulating layer INS6 may be exposed (or an area in which the contact holes may be formed in the sixth insulating layer INS6), the first and second electrodes ELT1 and ELT2 may be connected to the first and second contact electrodes CNE1 and CNE2, respectively.

The sixth insulating layer INS6 may be composed of a single layer or multiple layers, and may include at least one inorganic insulating material and/or organic insulating material. In an embodiment, the sixth insulating layer INS6 may include at least one kind of inorganic insulating material such as silicon nitride (SiNx), silicon oxide (SiOx), silicon oxynitride (SiOxNy), or a combination thereof.

As the first and second electrodes ELT1 and ELT2 and the conductive pattern CDP may be covered by the sixth insulating layer INS6, damage to the first and second electrodes ELT1 and ELT2 and the conductive pattern CDP in a subsequent process can be prevented. A short defect in which the first and second electrodes ELT1 and ELT2 and the light emitting elements LD may be improperly connected can be prevented.

In the emission areas corresponding to the emission units EMU of the pixels PXL, the light emitting elements LD may be supplied and aligned on the sixth insulating layer INS6. The light emitting elements LD may be aligned between the first electrode ELT1 and the second electrode ELT2 of a corresponding emission unit EMU.

Each light emitting element LD may include a first semiconductor layer SCL1 (for example, a P-type semiconductor layer), an active layer ACT, and a second semiconductor layer SCL2 (for example, an N-type semiconductor layer) sequentially disposed in any direction (for example, from the first end EP1 to the second end EP2). Each light emitting element LD may further include an insulating thin film surrounding an outer circumferential surface (for example, a side surface of a cylinder) of the first semiconductor layer SCL1, the active layer ACT, and the second semiconductor layer SCL2.

The first semiconductor layer SCL1 may include a first conductivity type semiconductor layer. For example, the first semiconductor layer SCL1 may include at least one P-type semiconductor layer. For example, the first semiconductor layer SCL1 may include the P-type semiconductor layer including at least one semiconductor material of InAlGaN, GaN, AlGaN, InGaN, AlN, and InN, and doped with a first conductivity type dopant (or P type dopant) such as Mg.

The active layer ACT may be formed in a single-quantum well structure or a multi-quantum well structure. According to an embodiment, materials such as AlGaN or AlInGaN may be used to form the active layer ACT, and in addition to these, the active layer ACT may be formed of various other materials. The position of the active layer ACT may be variously changed according to the type of the light emitting element LD. The active layer ACT may emit light having a wavelength of about 400 nm to about 900 nm, and a double hetero-structure may be used.

The second semiconductor layer SCL2 may include a semiconductor layer of a different type from the first semiconductor layer SCL1. For example, the second semiconductor layer SCL2 may include at least one N-type semiconductor layer. As an example, the second semiconductor layer SCL2 may be the N-type semiconductor layer including at least one semiconductor material of InAlGaN, GaN, AlGaN, InGaN, AlN, and InN, and doped with a second conductivity type dopant (or N-type dopant) such as Si, Ge, Sn, and the like.

Before supplying the light emitting elements LD, the bank BNK may be formed around the emission areas of the pixels PXL. For example, the bank BNK may be formed on the sixth insulating layer INS6 to surround the emission areas of the pixels PXL. Accordingly, each emission area to which the light emitting elements LD are to be supplied may be defined. For example, the bank BNK may be a pixel defining layer including a plurality of openings corresponding to the emission areas of the pixels PXL. The bank may be formed to cover outer areas of the pixels PXL, an area in which the circuit elements of the driving circuit may be formed, and/or the non-pixel areas between the pixels PXL. The bank BNK may include a black matrix material as well as a light shielding and/or reflective material. Accordingly, optical interference between the pixels PXL can be prevented.

Insulating patterns INP may be disposed on a portion of the light emitting elements LD. For example, each insulating pattern INP may be disposed locally on a portion including a central portion of the light emitting elements LD to expose the first and second ends EP1 and EP2 of the light emitting elements LD aligned in a corresponding emission area. In case that the insulating pattern INP may be formed on the light emitting elements LD, the light emitting elements LD can be stably fixed.

The insulating pattern INP may be composed of a single layer or multiple layers, and may include at least one inorganic insulating material and/or an organic insulating material. For example, the insulating pattern INP may include various kinds of organic/inorganic insulating materials such as silicon nitride (SiNx), silicon oxide (SiOx), silicon oxynitride (SiOxNy), aluminum oxide ($Al_XO_Y$), photoresist (PR) material, and the like, or a combination thereof.

The first and second contact electrodes CNE1 and CNE2 may be formed on both ends, for example, the first and second ends EP1 and EP2 of the light emitting elements LD that may not be covered by the insulating pattern INP, respectively.

The first and second contact electrodes CNE1 and CNE2 may be formed to be separated from each other. For example, the first and second contact electrodes CNE1 and CNE2 of each pixel PXL may be disposed to be spaced apart from each other on the first and second ends EP1 and EP2 of the light emitting elements LD with the insulating pattern INP interposed therebetween. Accordingly, the first contact electrode CNE1 may be connected to the first ends EP1 of the light emitting elements LD provided in a corresponding pixel PXL, and the second contact electrode CNE2 may be connected to the second ends EP2 of the light emitting elements LD.

The first contact electrode CNE1 may be disposed above the first electrode ELT1 to be connected to the first electrode ELT1 of the corresponding pixel PXL, and the second contact electrode CNE2 may be disposed above the second electrode ELT2 to be connected to the second electrode ELT2 of the corresponding pixel PXL. Accordingly, the first ends EP1 of the light emitting elements LD may be connected to the first electrode ELT1 of the corresponding pixel PXL, and the second ends EP2 of the light emitting elements LD may be connected to the second electrode ELT2 of the corresponding pixel PXL.

The first and second contact electrodes CNE1 and CNE2 may include at least one conductive material. In an embodiment, the first and second contact electrodes CNE1 and CNE2 may include a transparent conductive material so that the light emitted from the light emitting elements LD can be transmitted.

In an embodiment, the display device DD may further include the light conversion layer CCL provided on the light emitting elements LD. For example, the light conversion layer CCL may be selectively disposed on each emission unit EMU in which the light emitting elements LD may be arranged.

The light conversion layer CCL may include wavelength conversion particles (or color conversion particles) that convert the wavelength and/or color of the light emitted from the light emitting elements LD, and/or light scattering particles SCT that increase light emission efficiency by scattering the light emitted from the light emitting elements LD. For example, each light conversion layer CCL including the wavelength conversion particles including at least one kind of quantum dot QD (for example, red, green and/or blue quantum dot), and/or the light scattering particles SCT may be provided on each emission unit EMU. For example, in case that any one pixel PXL is set as a red (or green) pixel and blue light emitting elements LD may be provided in the emission unit EMU of the pixel PXL, the light conversion layer CCL including red (or green) quantum dots QD for converting blue light into red (or green) light may be disposed on the emission unit EMU of the pixel PXL. The light conversion layer CCL may further include the light scattering particles SCT.

A seventh insulating layer INS7 may be formed on a surface of the base layer BSL including the emission units EMU and/or light conversion layers CCL.

In an embodiment, the seventh insulating layer INS7 may be a second planarization layer for protecting the emission units EMU and/or the light conversion layers CCL and substantially planarizing the surface of the display layer DPL. For example, the seventh insulating layer INS7 may include at least an organic insulating layer.

The color filter layer CFL may be disposed on the seventh insulating layer INS7.

The color filter layer CFL may include color filters CF corresponding to the color of each pixel PXL. For example, the color filter layer CFL may include a first color filter CF1 disposed on the first emission unit EMU1 of the first pixel PXL1, a second color filter CF2 disposed on the second emission unit EMU2 of the second pixel PXL2, and a third color filter CF3 disposed on the third emission unit EMU3 of the third pixel PXL3. In an embodiment, the first, second, and third color filters CF1, CF2, and CF3 may be disposed to overlap each other on a non-emission area in which the bank BNK may be formed to block optical interference between the pixels PXL. In another embodiment, the first, second, and third color filters CF1, CF2, and CF3 may be separate patterns individually formed on the first, second, and third emission units EMU1, EMU2, and EMU3 (in particular, the emission area of each of the first, second, and third emission units EMU1, EMU2, and EMU3), respectively. A light blocking pattern (not shown) may be disposed between the first, second, and third emission units EMU1, EMU2, and EMU3.

The encapsulation layer ENC may be disposed on the color filter layer CFL. The encapsulation layer ENC may include at least one insulating layer including an eighth insulating layer INS8. The eighth insulating layer INS8 may be formed on an entire surface of the display area DA to cover the circuit layer PCL, the display layer DPL, and/or the color filter layer CFL.

The eighth insulating layer INS8 may include at least one of an inorganic layer and/or an organic layer. For example, the eighth insulating layer INS8 may be composed of a single layer or multiple layers, and may include at least one inorganic insulating material and/or organic insulating material. For example, the eighth insulating layer INS8 may include various kinds of organic/inorganic insulating materials such as silicon nitride (SiNx), silicon oxide (SiOx), silicon oxynitride (SiOxNy), aluminum oxide ($Al_XO_Y$), or a combination thereof.

In an embodiment, the eighth insulating layer INS8 may be formed in a multilayer structure. For example, the eighth insulating layer INS8 may be formed of a multi-layered thin film encapsulation layer including at least two inorganic insulating layers and at least one organic insulating layer interposed between the at least two inorganic insulating layers. However, the material and/or structure of the eighth insulating layer INS8 may be variously changed. According to embodiments, at least one overcoat layer, a filler layer, and/or an upper substrate may be further disposed on the eighth insulating layer INS8.

Figure 13:
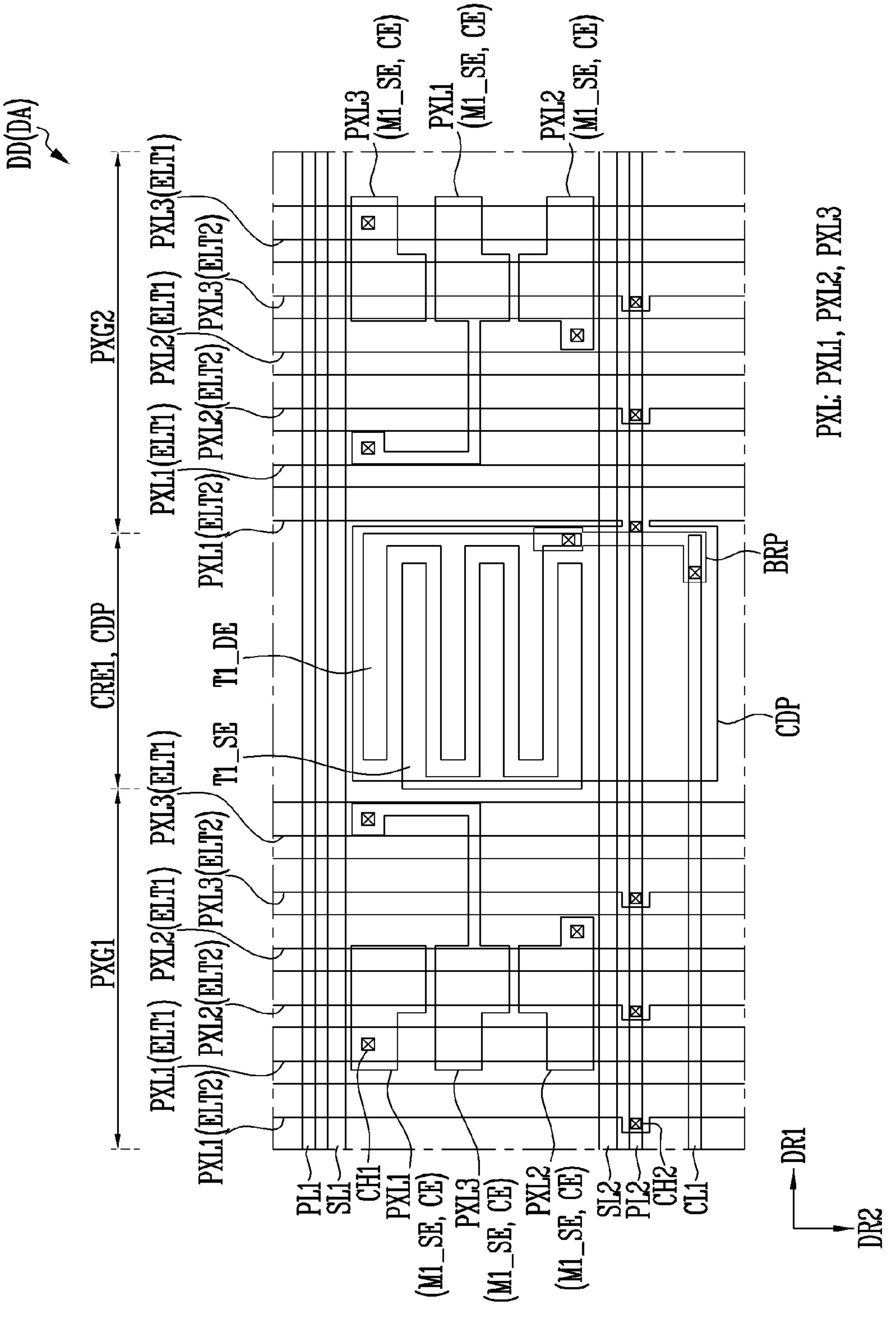
FIG. 13 is a schematic plan view illustrating components disposed in a display area of a display device according to an embodiment.

FIG. 13 is a schematic plan view illustrating components disposed in a display area DA of a display device DD according to an embodiment. For example, FIG. 13 is a plan view illustrating an example of an area in which the first and second pixel groups PXG1 and PXG2, the first circuit element CRE1, and the conductive pattern CDP of FIG. 7 may be formed. Some configurations of the first and second pixel groups PXG1 and PXG2 and the first circuit element CRE1, and the conductive pattern CDP are shown.

For example, FIG. 13 shows some electrodes of the first circuit element CRE1 (for example, source and drain electrodes T1_SE and T1_DE of the first transistor T1) and the first clock line CL1, some configurations of the first, second, and third pixels PXL1, PXL2, and PXL3 (for example, a source electrode M1_SE of the first transistor M1 of each of the first, second, and third pixels PXL1, PXL2, and PXL3, and one electrode CE of the capacitor Cst integrally connected to the source electrode M1_SE) positioned around some electrodes of the first circuit element CRE1 and the first clock line CL1 and formed on the same layer as the electrodes, the first and second scan lines SL1 and SL2, and the first and second power source lines PL1 and PL2. FIG. 13 shows the conductive pattern CDP and the first and second electrodes ELT1 and ELT2 of each of the first, second, and third pixels PXL1, PXL2, and PXL3 formed on the same layer as the conductive pattern CDP.

Referring to FIGS. 7 to 13, the source and drain electrodes T1_SE and T1_DE of the first transistor T1 constituting the first circuit element CRE1, and the first clock line CL1 may be disposed on the same layer. The drain electrode T1_DE of the first transistor T1 and the first clock line CL1 may be electrically connected to each other through a bridge pattern BRP disposed on a different layer from the drain electrode T1_DE and the first clock line CL1.

The first, second, and third pixels PXL1, PXL2, and PXL3 of each of the first and second pixel groups PXG1 and PXG2 may include the first transistors M1 and capacitors Cst. Source electrodes M1_SE of the first transistors M1 and one electrodes CE of the capacitors Cst may be disposed on the same layer as the first circuit element CRE1 and the first clock line CL1 so as to be adjacent to the first circuit element CRE1 and the first clock line CL1. Accordingly, a parasitic capacitance may be generated between second nodes N2 (shown in FIG. 3) of the pixels PXL to which the source electrodes M1_SE of the first transistors M1 and the one electrodes CE of the capacitors Cst may be connected, and the first circuit element CRE1 (in particular, the source and drain electrodes T1_SE and T1_DE of the first transistor T1) and the first clock line CL1.

In an embodiment, the size of the parasitic capacitance formed in the second node N2 of each pixel PXL by the first circuit element CRE1 and the first clock line CL1 may be different for each pixel PXL. For example, in the first pixel group PXG1, since the source electrode M1_SE of the first transistor M1 included in the third pixel PXL3 may be disposed closest to the source and drain electrodes T1_SE and T1_DE of the first circuit element CRE1, the parasitic capacitance formed in the second node N2 of the third pixel PXL3 may be larger than the parasitic capacitance formed in the second node N2 of each of the first and second pixels PXL1 and PXL2. In the second pixel group PXG2, since the source electrode M1_SE of the first transistor M1 included in the first pixel PXL1 may be disposed closest to the source and drain electrodes T1_SE and T1_DE of the first circuit element CRE1, the parasitic capacitance formed in the second node N2 of the first pixel PXL1 may be larger than the parasitic capacitance formed in the second node N2 of each of the second and third pixels PXL2 and PXL3.

For example, the sizes of parasitic capacitances formed in the pixels PXL by the first circuit element CRE1 and the first clock line CL1 may be different from each other. Deviation in the parasitic capacitance may cause image quality defects by changing the operating characteristics of the pixels PXL differently.

In order to prevent such image quality defects, in embodiments of the disclosure, the conductive pattern CDP may be formed on the first circuit element CRE1 and/or the first clock line CL1, and the conductive pattern CDP may be connected to an adjacent power source line (for example, the second power source line PL2). Accordingly, the size of the parasitic capacitance formed between the source and drain electrodes T1_SE and T1_DE of the first circuit element CRE1 and the first clock line CL1, and the second nodes N2 of the pixels PXL and/or the deviation in the parasitic capacitance may be reduced. Accordingly, according to embodiments of the disclosure, the deviation in characteristics of the pixels PXL may be reduced or prevented, and the image quality of the display device DD may be improved.

In the above-described embodiments, the conductive pattern CDP may be simultaneously formed on the same layer as the first and second electrodes ELT1 and ELT2, but embodiments are not limited thereto. For example, the conductive pattern CDP may be simultaneously formed on the same layer as other electrodes of the emission unit EMU, for example, the first and second contact electrodes CNE1 and CNE2 shown in FIGS. 4, 11 and 12. For example, the conductive pattern CDP may be simultaneously formed with the electrodes provided on the emission units EMU of the display layer DPL, and may be formed to shield the first circuit element CRE1 and/or the first clock line CL1 of the circuit layer PCL.

According to embodiments, the circuit elements of the driving circuit may be disposed between the pixels in the display area. Accordingly, the manufacturing cost of the display device can be reduced, and the non-display area can be reduced.

Further, according to the embodiments, the conductive pattern overlapping the circuit element of the driving circuit may be disposed on the same layer as the first and second electrodes of the pixels, and the conductive pattern may be connected to the second power source line. Accordingly, the deviation in characteristics of the pixels due to the deviation in parasitic capacitance formed between the circuit element of the driving circuit and the signal lines connected thereto and the pixels can be reduced or prevented, thereby improving the image quality of the display device. In the process of forming the emission units of the pixels, the conductive pattern can be easily formed.

The effects according to the embodiments are not limited by the contents described above, and additional effects are at least inherent in the disclosure.

Although the technical spirit of the disclosure has been described in detail through the above-described embodiments, it should be noted that the above-described embodiments are for illustrative purpose only and are not intended to limit the disclosure. Those skilled in the art may understand that various modifications are possible within the scope of the technical spirit of the disclosure.

The scope of the disclosure is not limited by the detailed descriptions of the specification, and should be defined by the accompanying claims including equivalents thereof. Furthermore, all changes or modifications of the disclosure derived from the meanings and scope of the claims and equivalents thereof should be construed as being included in the scope of the disclosure.

What is claimed is:

1. A display device comprising:

gate lines and data lines disposed in a display area;

pixels disposed in the display area, the pixels being electrically connected to the gate lines, the data lines, a first power source line, and a second power source line such that current provided to the gate lines, the data lines, the first power source line, and the second power source line is supplied to the pixels;

a driving circuit supplying gate signals and data signals to the gate lines and the data lines, the driving circuit including a first circuit element disposed in the display area between pixel groups that are electrically connected to different ones of the gate lines and the data lines, each of the pixel groups include more than one of the pixels; and a conductive pattern disposed in the display area and overlapping the first circuit element in a plan view, the conductive pattern electrically connected to the second power source line such that current provided to the second power source line is supplied to the conductive pattern, wherein each of the pixels includes:

a pixel circuit including a driving transistor including an electrode electrically connected to the first power source line; and an emission unit electrically connected to the pixel circuit, the emission unit including:

a first electrode electrically connected to another electrode of the driving transistor such that current provided to the first power source line is supplied to the first electrode through the driving transistor;

a second electrode electrically connected to the second power source line such that current provided to the second power source line is supplied to the second electrode; and at least one light emitting element disposed and electrically connected between the first electrode and the second electrode, the first electrode and the another electrode of the driving transistor are disposed on different layers, and the conductive pattern, the first electrode, and the second electrode are disposed on a same layer.

2. The display device of claim 1, wherein the display area includes a first clock line electrically connected to the first circuit element and transmitting a first clock signal, and the conductive pattern overlaps the first clock line in a plan view.

3. The display device of claim 2, wherein the first clock line extends in a first direction and parallel to the gate lines and passes through an area between an i-th pixel row and an (i+1)th pixel row of the display area.

4. The display device of claim 3, wherein the first circuit element is disposed in a non-pixel area between two unit pixel areas disposed parallel to each other in the i-th pixel row, and the first clock line is disposed between the second power source line connected to the pixels in the i-th pixel row and the first power source line connected to the pixels in the (i+1)th pixel row.

5. The display device of claim 2, wherein the conductive pattern is a separate pattern on the first clock line and on the first circuit element so as not to overlap the pixels in a plan view.

6. The display device of claim 1, wherein the display area includes at least one gate line adjacent to the first circuit element, and the conductive pattern overlaps the at least one gate line in a plan view.

7. The display device of claim 1, wherein the driving circuit further includes a second circuit element disposed in the display area adjacent to the first circuit element, and the conductive pattern overlaps the first circuit element and the second circuit element in a plan view.

8. The display device of claim 1, wherein the conductive pattern is adjacent to at least one pixel, and the conductive pattern and the second electrode of the at least one adjacent pixel are integral with each other.

9. The display device of claim 1, wherein the driving circuit includes:

a gate driver including circuit elements that include the first circuit element and disposed between the pixels, the gate driver outputting the gate signals to the gate lines; and a data driver outputting the data signals to the data lines.

10. The display device of claim 9, wherein the data driver is disposed only at a side area of a display panel adjacent to a side of the display area.

11. The display device of claim 9, wherein the gate driver includes an i-th stage including the first circuit element, and the first circuit element is a transistor connected to a first clock line transmitting a first clock signal and outputting an i-th gate signal to an i-th gate line using the first clock signal.

12. The display device of claim 1, wherein the display area includes pixel groups positioned in each unit pixel area, and the gate lines include:

a first scan line connected to even-numbered pixel groups positioned in the i-th pixel row of the display area; and a second scan line connected to odd-numbered pixel groups positioned in the i-th pixel row.

13. The display device of claim 12, wherein the i-th pixel row includes:

a first pixel group including pixels connected to first data lines and the first scan line;

a second pixel group disposed at a first side of the first pixel group and including pixels connected to second data lines and the second scan line;

a third pixel group disposed at a second side of the first pixel group and including pixels connected to the first data lines and the second scan line; and a fourth pixel group disposed at a first side of the second pixel group and including pixels connected to the second data lines and the first scan line.

14. The display device of claim 13, wherein the first circuit element is disposed between the first pixel group and the second pixel group, the first data lines are disposed between the first pixel group and the third pixel group, and the second data lines are disposed between the second pixel group and the fourth pixel group.

15. The display device of claim 1, wherein the display area includes a first pixel group and a second pixel group each including pixels, and the first circuit element is disposed between a first unit pixel area in which the first pixel group is disposed and a second unit pixel area in which the second pixel group is disposed.

16. The display device of claim 15, wherein the display area further includes a fifth pixel group and a sixth pixel group each including pixels, and the driving circuit further includes a second circuit element disposed between a unit pixel area in which the fifth pixel group is disposed and another unit pixel area in which the sixth pixel group is disposed.

17. The display device of claim 1, wherein each of the pixels includes:

a pixel circuit connected to each gate line, each data line, and the first power source line and including a driving transistor; and an emission part electrically connected between an electrode of the driving transistor and the second power source line, the emission part including the first electrode, the second electrode, and the at least one light emitting element.

18. The display device of claim 17, wherein the first circuit element includes a first electrode connected to a first clock line, and the first electrode of the first circuit element, the first clock line, and the electrode of the driving transistor are disposed on a same layer.

19. The display device of claim 17, wherein the display area includes a first pixel, a second pixel, and a third pixel that are disposed in a first unit pixel area, emission parts of the first pixel, the second pixel, and the third pixel are disposed in a first direction in the first unit pixel area, and pixel circuits of the first pixel, the second pixel, and the third pixel are disposed in a second direction in the first unit pixel area.

20. The display device of claim 19, wherein the emission part of the first pixel overlaps the pixel circuits of the first pixel, the second pixel, and the third pixel in a plan view.

21. The display device of claim 1, wherein the at least one light emitting element has an elongated form, the first electrode is electrically connected to a first distal end of the at least one light emitting element and the second electrode is electrically connected to a second and opposite distal end of the at least one light emitting element, and the first electrode is spaced apart from the second electrode in a direction orthogonal to a thickness direction of the display device.

22. The display device of claim 1, wherein the conductive pattern overlaps the first circuit element in a thickness direction of the display device.

23. The display device of claim 1, wherein the conductive pattern, the first electrode, and the second electrode are disposed directly on the same layer.

24. The display device of claim 1, wherein the pixels are directly electrically connected to the gate lines, the data lines, the first power source line, and the second power source line, the conductive pattern is directly electrically connected to the second power source line, the first electrode is electrically connected to the first power source line through the driving transistor, and the second electrode is directly electrically connected to the second power source line.

25. The display device of claim 1, wherein the first electrode is an anode of the emission unit and the second electrode is a cathode of the emission unit.

26. The display device of claim 1, wherein each of the first electrode and the second electrode are in direct contact with the at least one light emitting element.

27. The display device of claim 1, wherein the conductive pattern, the first electrode, and the second electrode are formed from a same layer and are directly disposed on the same layer.

28. The display device of claim 1, wherein the first electrode, the second electrode, and the conductive pattern are comprised of a same material and are disposed directly on the same layer.

29. The display device of claim 1, further comprising an insulating layer covering a portion of the another electrode of the driving transistor and exposing another portion of the another electrode of the driving transistor, wherein the first electrode is in contact with the another portion of the another electrode of the driving transistor exposed by the insulating layer.

30. A display device comprising:

gate lines and data lines disposed in a display area;

pixels disposed in the display area, the pixels being directly electrically connected to the gate lines, the data lines, a first power source line, and a second power source line;

a driving circuit supplying gate signals and data signals to the gate lines and the data lines, the driving circuit including a first circuit element disposed in the display area between pixel groups that are directly electrically connected to different ones of the gate lines and the data lines, each of the pixel groups include more than one of the pixels; and a conductive pattern disposed in the display area and overlapping the first circuit element in a plan view, the conductive pattern directly electrically connected to the second power source line, wherein each of the pixels includes:

a pixel circuit including a driving transistor including a source electrode and a drain electrode; and an emission unit including:

a first electrode electrically connected to the first power source line through the driving transistor;

a second electrode directly electrically connected to the second power source line; and at least one light emitting element disposed and electrically connected between the first electrode and the second electrode, the source electrode and the drain electrode of the driving transistor are disposed on a different layer from the first electrode, and the conductive pattern, the first electrode, and the second electrode are formed from a same layer.

* * * * *